(12) United States Patent
Kamiya et al.

(10) Patent No.: US 10,412,243 B2
(45) Date of Patent: Sep. 10, 2019

(54) IMAGE FORMATION DEVICE HAVING AN OPERATION PANEL CONFIGURED TO MOVE BETWEEN A FIRST POSITION AND A SECOND POSITION

(71) Applicant: Konica Minolta, Inc., Chiyoda-ku, Tokyo (JP)

(72) Inventors: Masahiro Kamiya, Toyohashi (JP); Naoto Sugaya, Toyokawa (JP); Chao Ye, Toyokawa (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 15/452,931

(22) Filed: Mar. 8, 2017

(65) Prior Publication Data

US 2017/0272593 A1 Sep. 21, 2017

(30) Foreign Application Priority Data

Mar. 18, 2016 (JP) .................... 2016-056224

(51) Int. Cl.
  *G03G 15/00* (2006.01)
  *G03G 21/16* (2006.01)
  *H04N 1/00* (2006.01)

(52) U.S. Cl.
  CPC ..... *H04N 1/00496* (2013.01); *G03G 15/5016* (2013.01); *G03G 15/553* (2013.01);
  (Continued)

(58) Field of Classification Search
  CPC .......... H04N 1/00496; H04N 1/00411; H04N 1/00543; H04N 2201/0094;
  (Continued)

(56) References Cited

U.S. PATENT DOCUMENTS 5,249,026 A * 9/1993 Kojima ............... G03G 15/01
  399/112
9,014,595 B2 4/2015 Itabashi
(Continued)

FOREIGN PATENT DOCUMENTS

CN  101350876 A  1/2009
CN  102262374 A  11/2011
(Continued)

OTHER PUBLICATIONS

Extended European Search Report dated Jul. 31, 2017, by the European Patent Office in corresponding European Patent Application No. 17159133.2-1568. ( 6 pages).

(Continued)

*Primary Examiner* — David M. Gray
*Assistant Examiner* — Laura Roth
(74) *Attorney, Agent, or Firm* — Buchanan Ingersoll & Rooney PC

(57) ABSTRACT

An image formation device for executing a printing job to form a toner image on a record sheet includes: an operation panel configured to move between a first position at which the operation panel protrudes from a front of a device body and a second position at which the operation panel is retracted to a device body side with respect to the first position. The device further includes an acquisition device configured to obtain state information indicating a state of the device body; and a hardware processor configured to determine, based on the obtained state information, whether the state of the device body is a state requiring a user access to the device body or a state of accessing to the device body. The device retracts the operation panel to the second position when a determination result is positive.

16 Claims, 18 Drawing Sheets

(52) U.S. Cl.
CPC ..... *G03G 21/1623* (2013.01); *H04N 1/00411* (2013.01); *H04N 1/00543* (2013.01); *G03G 21/1638* (2013.01); *H04N 2201/0094* (2013.01)

(58) Field of Classification Search
CPC ........... G03G 15/5016; G03G 21/1638; G03G 15/55; G03G 15/553
See application file for complete search history.

(56) References Cited

U.S. PATENT DOCUMENTS

| | | | |
|---|---|---|---|
| 2002/0163570 A1* | 11/2002 | Phillips | G03G 15/01 347/224 |
| 2008/0084020 A1* | 4/2008 | Nakamura | B41J 11/485 270/1.01 |
| 2009/0021451 A1 | 1/2009 | Suto | |
| 2012/0188589 A1* | 7/2012 | Potter | H04N 1/00411 358/1.15 |
| 2013/0077114 A1 | 3/2013 | Short et al. | |

FOREIGN PATENT DOCUMENTS

| | | |
|---|---|---|
| EP | 2 787 398 A1 | 10/2014 |
| JP | 2001-296709 A | 10/2001 |
| JP | 2001296709 A * | 10/2001 |
| JP | 2006-010867 A | 1/2006 |
| JP | 2008134459 A * | 6/2008 |
| JP | 2010-149414 A | 7/2010 |
| JP | 2014-089359 A | 5/2014 |
| JP | 2014089359 A * | 5/2014 |

OTHER PUBLICATIONS

Communication issued in corresponding European Patent Application No. 17159133.2-1568, dated Jun. 20, 2018 ( 5 pages).

Office Action (First Office Action) dated Oct. 9, 2018, by the Chinese Patent Office in corresponding Chinese Patent Application No. 201710149416.3, and an English Translation of the Office Action. (14 pages).

Office Action (Communication) dated Dec. 18, 2018, by the European Patent Office in corresponding European Patent Application No. 17159133.2. (5 pages).

* cited by examiner

IMAGE FORMATION DEVICE HAVING AN OPERATION PANEL CONFIGURED TO MOVE BETWEEN A FIRST POSITION AND A SECOND POSITION

The entire disclosure of Japanese Patent Application No. 2016-056224 filed on Mar. 18, 2016 including description, claims, drawings, and abstract are incorporated herein by reference in its entirety.

BACKGROUND OF THE INVENTION

Field of the Invention

The present invention relates to an image formation device such as a printer and a copying machine, and particularly relates to an image formation device configured such that an operation panel is disposed at a position protruding from a device body.

Description of the Related Art

With multi-functionalization of an image formation device such as a copying machine, an operation panel size tends to be large in the image formation device. A space occupied by the operation panel in the device is large, and for this reason, an image formation device configured such that an operation panel protrudes from a device body has been utilized.

The above-described image formation device includes an image formation device including a tilt mechanism configured to adjust an operation panel angle. Using this tilt mechanism, a user can adjust the operation panel angle to an easily-operable angle (see JP 2014-089359 A and JP 2010-149414 A).

However, in the above-described image formation device, the operation panel protrudes from the device body. For this reason, the following situation might occur: when the user accesses to the device body to perform, e.g., the processing of replacing/resupplying a consumable such as toner and paper or jam processing, the operation panel interferes with the user, resulting in accidental contact with a protruding portion of the operation panel. This leads to a defect resulting in the failure to smoothly executing the above-described processing etc.

SUMMARY OF THE INVENTION

The present invention has been made in view of the above-described problem, and an object thereof is to provide an image formation device which includes an operation panel protruding from a device body and which is configured so that upon a user access to the device body, the operation panel less interferes with a user and the user less contacts the operation panel.

To achieve the abovementioned object, according to an aspect, an image formation device for executing a printing job to form a toner image on a record sheet, reflecting one aspect of the present invention comprises: an operation panel configured to move between a first position at which the operation panel protrudes from a front of a device body and a second position at which the operation panel is retracted to a device body side with respect to the first position; an acquisition device configured to obtain state information indicating a state of the device body; and a hardware processor configured to determine, based on the obtained state information, whether the state of the device body is a state requiring a user access to the device body or a state of accessing to the device body and to retract the operation panel to the second position when a determination result is positive.

The state information preferably includes information on whether or not a consumable of the device body is empty, and when the consumable is empty, the hardware processor preferably makes determination as being the state requiring the user access.

Furthermore, the device body preferably includes a waste toner bottle, the state information preferably includes information on whether or not the waste toner bottle is in a full state, and when the waste toner bottle is in the full state, the hardware processor preferably makes determination as being the state requiring the user access.

Furthermore, the state information preferably includes information on whether or not jam occurs in the device body, and when the jam occurs, the hardware processor preferably makes determination as being the state requiring the user access.

Furthermore, the image formation device preferably further comprises a detection device configured to detect a presence or absence of the access to the device body, the state information preferably includes a detection result obtained by the detection device, and when the detection result shows the presence of the access, the hardware processor preferably makes determination as being the state requiring the user access.

Furthermore, the image formation device preferably further comprises a detection device configured to detect a presence or absence of the access to the front of the device body, the state information preferably includes a detection result obtained by the detection device, and when the detection result shows the presence of the access, the hardware processor preferably makes determination as being the state requiring the user access. Furthermore, the hardware processor preferably displays, on the operation panel, information on a current state of the device body when the determination result is positive.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein.

DESCRIPTION OF THE PREFERRED EMBODIMENTS

Hereinafter, the case where an embodiment of an image formation device of the present invention is applied to a tandem image formation device (hereinafter simply referred to as an "image formation device") will be described as an example with reference to the drawings. However, the scope of the invention is not limited to the illustrated examples.

[1] Configuration of Image Formation Device

Figure 1A:
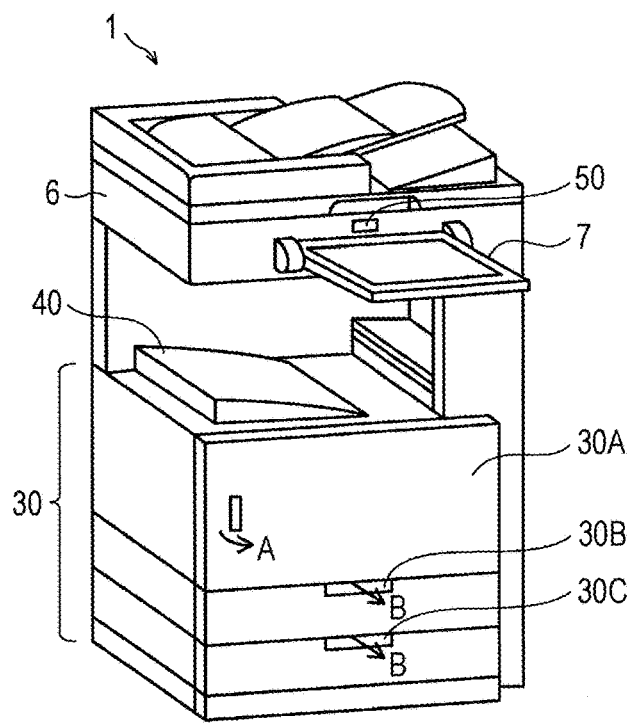
FIGS. 1A and 1B are perspective views of an outer appearance of an image formation device.
Figure 1B:
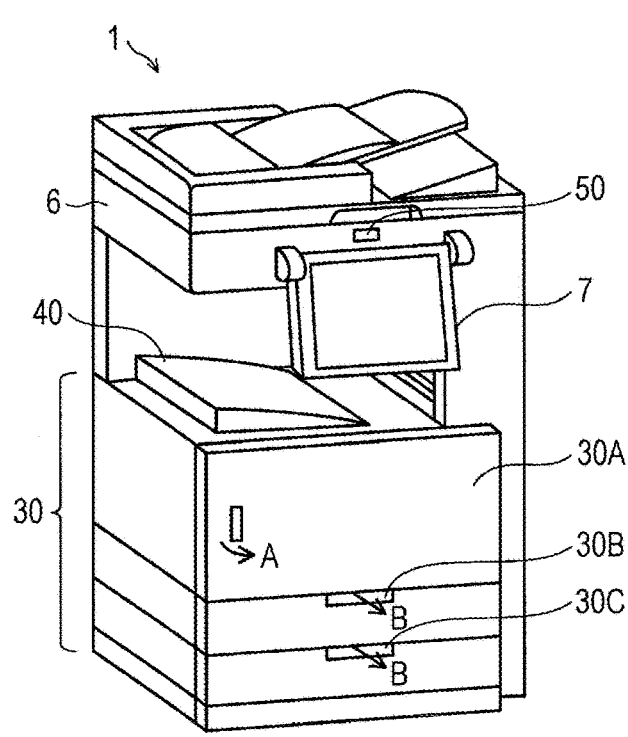

FIGS. 1A and 1B are perspective views of an outer appearance of an image formation device 1 of the present embodiment. As illustrated in FIGS. 1A and 1B, the image formation device 1 includes a device body having an image reading device 6 and a printer section 30 configured to perform printing processing and to discharge, to a paper discharge section 40, a record sheet on which a toner image has been printed; an operation panel 7 swingably disposed on an outer surface of the image reading device 6; and a human sensor 50 disposed on the outer surface of the image reading device 6.

A side of the device body on which the operation panel 7 is disposed is the "front of the device body." The operation panel 7 is configured to swingably move between an operation position at which the operation panel 7 protrudes from the front of the device body as illustrated in FIG. 1A and a housing position at which the operation panel 7 is retracted from the operation position to a device body side as illustrated in FIG. 1B.

The image reading device 6 includes an image input device such as a scanner, and is configured to read information such as characters and patterns written on a record sheet such as paper to form image data.

Toner bottles configured to house toner in each color of yellow, magenta, cyan, and black and a waste toner bottle configured to house waste toner are accommodated in an upper portion of a housing of the printer section 30. A user opens, in a direction indicated by an arrow A, a front door 30A provided on the front side of the housing (the front of the device body), thereby accessing to the toner bottle for each color or the waste toner bottle to replace the toner bottle. Moreover, the front door 30A is provided with a not-shown front door opening/closing sensor configured to detect opening/closing of the door.

Paper supply cassettes each configured to house record sheets to be supplied are accommodated in a lower portion of the housing of the printer section 30. The user uses a handle 30B, 30C provided on the front side of the housing to pull out (pull out in a direction indicated by an arrow B) the paper supply cassette, thereby accessing to the paper supply cassette to resupply record sheets. Further, each paper supply cassette is provided with a not-shown cassette opening/closing sensor configured to detect whether the paper supply cassette is in an open state in which the paper supply cassette is pulled out or a closed state in which the paper supply cassette is accommodated in the housing.

Figure 2:
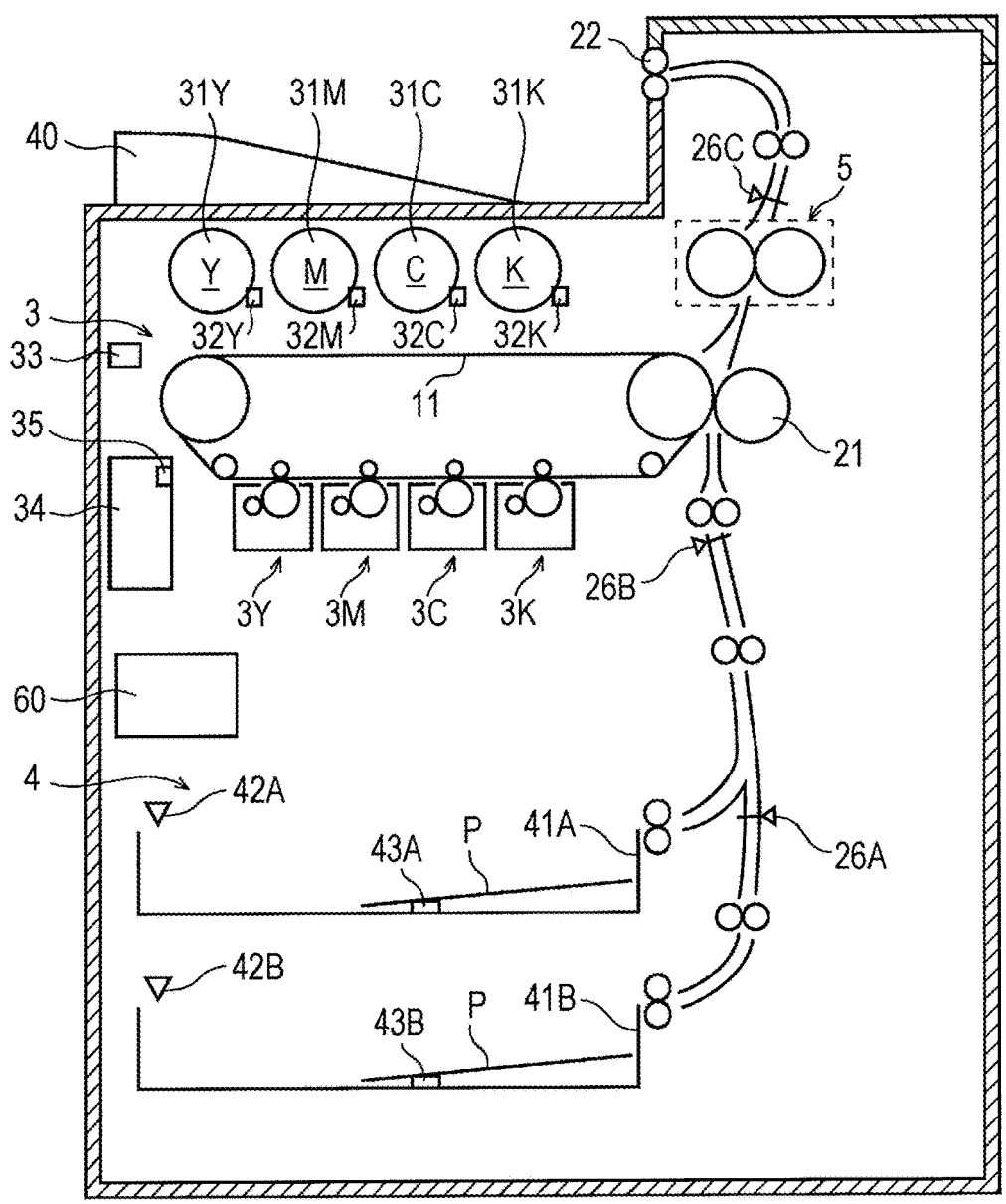
FIG. 2 is a cross-sectional view of an inner configuration of a housing of a printer section from a front (from a front side of the housing)

FIG. 2 is a cross-sectional view of an inner configuration of the housing of the printer section 30 from the front (from the front side of the housing). Toner bottles 31Y, 31M, 31C, 31K for colors of yellow, magenta, cyan, and black are detachably arranged at the upper portion in the housing of the printer section 30, each toner bottle being configured to house toner for resupply. Further, toner empty sensors 32Y, 32M, 32C, 32K each configured to detect the absence of the toner for a corresponding one of the colors are each arranged near the toner bottle for a corresponding one of the colors. For example, an optical sensor can be used as the toner empty sensor. Moreover, a front door opening/closing sensor 33 configured to detect opening/closing of the front door 30A is provided at the upper portion in the housing of the printer section 30. For example, a tact switch can be used as the front door opening/closing sensor 33.

Further, a waste toner bottle 34 configured to house waste toner resulting from removal of toner remaining on an intermediate transfer belt 11 by a not-shown cleaner is detachably disposed at a center portion in the housing. A waste toner detection sensor 35 configured to detect that the waste toner bottle 34 is filled with the waste toner is disposed in the waste toner bottle 34. For example, an optical sensor can be used as the waste toner detection sensor 35.

The printer section 30 includes an image processing section 3, a paper supply section 4, a fixing device 5, etc. The printer section 30 is connected to a network (e.g., a LAN). When receiving a printing instruction from an external terminal device (not shown) or the operation panel 7, the printer section 30 forms, based on such an instruction, a toner image in each color of yellow, magenta, cyan, and black, and transfers these images onto a record sheet such that the images overlap with each other, thereby forming a full-color image. In this manner, the processing of printing on the record sheet is executed.

The image processing section 3 is disposed at the center portion in the housing of the printer section 30. The image processing section 3 includes imaging sections 3Y, 3M, 3C, 3K, the intermediate transfer belt 11, secondary transfer rollers 21, etc. The image processing section 3 forms, based on the image data, the toner image in each color of yellow, magenta, cyan, and black, and then, primarily transfers these images onto the intermediate transfer belt 11 such that the images overlap with each other at the same position on the intermediate transfer belt 11. Subsequently, the image processing section 3 uses action of electrostatic force due to the secondary transfer rollers 21 to secondarily transfer, at once, the toner images from the intermediate transfer belt 11 to a record sheet delivered from the paper supply section 4.

Then, the record sheet onto which the toner images have been secondarily transferred is further delivered to the fixing device 5. After the toner images (unfixed images) on the record sheet have been thermally fixed onto the record sheet by heating and pressurizing in the fixing device 5, the record sheet is discharged to the paper discharge section 40 by discharge rollers 22.

The paper supply section 4 is disposed at the lower portion in the housing of the printer section 30. The paper supply section 4 includes, for example, paper supply cassettes 41A, 41B configured to house record sheets P, and various rollers configured to deliver each record sheet to the image processing section 3. The paper supply cassette 41A, 41B further includes a cassette opening/closing sensor 42A, 42B configured to detect opening/closing of the paper supply cassette, and a paper empty sensor 43A, 43B configured to detect that no record sheet is present in the paper supply cassette 41A, 41B. For example, optical sensors can be used as the cassette opening/closing sensor and the paper empty sensor.

Further, jam sensors 26A, 26B, 26C configured to detect the presence or absence of a record sheet on a record sheet delivery path to detect occurrence of jam are provided at the delivery path. For example, a photo sensor can be used as the jam sensor. In addition, a control section 60 configured to control the entirety of the image formation device 1 including the printer section 30 is provided in the housing of the printer section 30.

Referring back to FIGS. 1A and 1B, the human sensor 50 is configured to detect whether or not an operator is near the operation panel 7. For example, an infrared sensor or a pyroelectric sensor can be used as the human sensor 50. Alternatively, the presence or absence of the operator may be detected using, e.g., an ultrasonic wave or a camera.

The operation panel 7 includes a liquid crystal display section, and a touch panel is stacked on a surface of the liquid crystal display section. The operation panel 7 receives, by touch input via the touch panel, an instruction from the user. Moreover, the operation panel 7 includes a later-described tilt mechanism, and is rotatably supported by the tilt mechanism.

Figure 3:
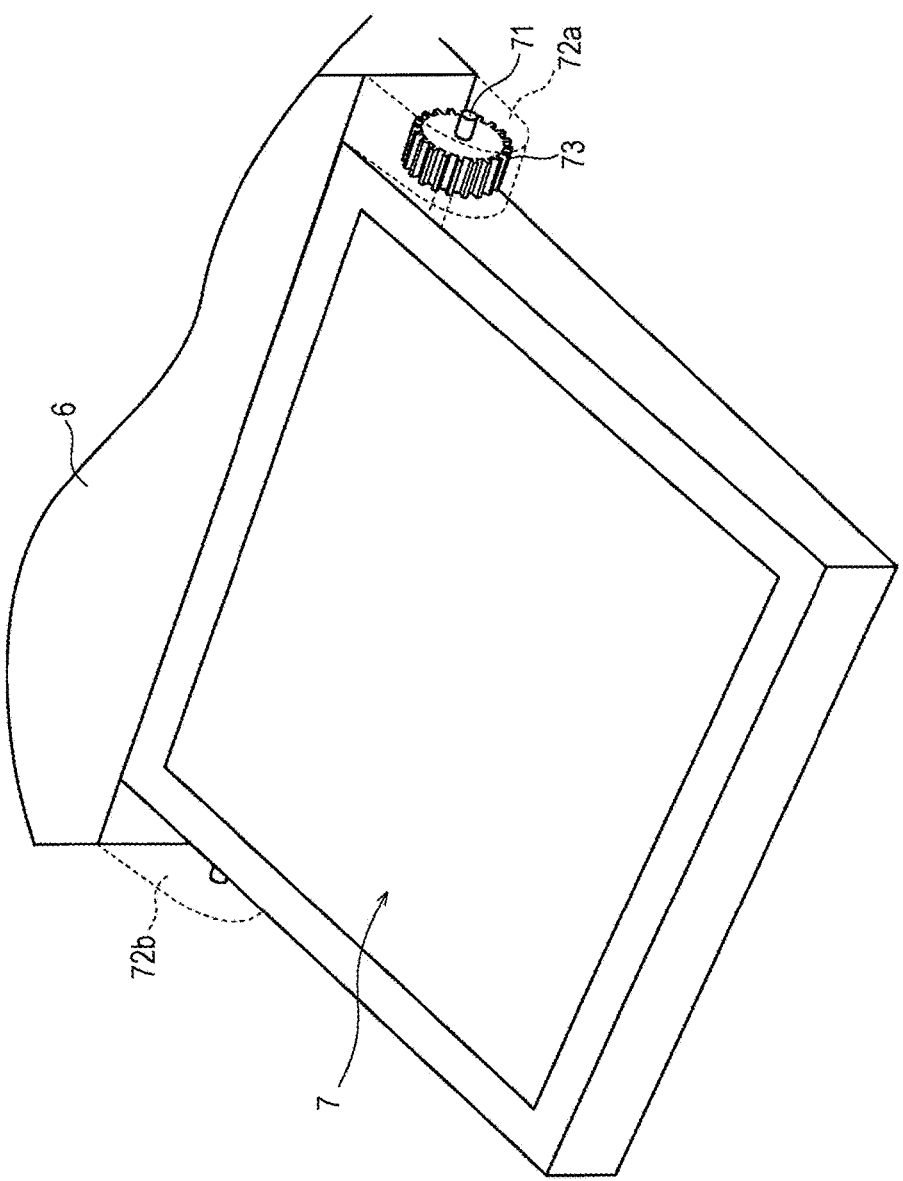
FIG. 3 is a perspective view of an example of a tilt mechanism of an operation panel.

FIG. 3 is a perspective view of an example of the tilt mechanism of the operation panel 7. The tilt mechanism includes, for example, a support shaft 71 about which an operation panel body rotates, support sections 72a, 72b (FIG. 3 illustrates a configuration inside the support sections, and therefore, the support sections are indicated by dashed lines) extending from the outer surface of the image reading device 6 to pivotably support the support shaft 71 from both sides of the body of the operation panel 7 in a width direction thereof, and a worm wheel 73 fixed to the pivotably-supported support shaft 71. When the worm wheel 73 rotates, the support shaft 71 rotates to swing the operation panel 7.

The worm wheel 73 is connected to a later-described tilt mechanism drive motor via a not-shown gear transmission mechanism. The tilt mechanism drive motor is rotatably driven such that the tilt mechanism is driven, and in this manner, the operation panel 7 swings. The tilt mechanism drive motor is controlled by the control section 60 such that the operation panel 7 swingably moves between the operation position illustrated in FIG. 1A and the housing position illustrated in FIG. 1B. In the present embodiment, the operation panel 7 moves to the operation position easily operable by the user when power is ON, and the control section 60 controls the operation panel 7 to move to the housing position such that the operation panel 7 does not interfere with a person walking by the side of the operation panel 7 when power is OFF.

Moreover, the tilt mechanism drive motor is configured so that the tilt mechanism drive motor can be rotatably driven in such a manner that the user touches an operation switch button displayed on the operation panel 7. With this configuration, the user can fine-adjust the angle of the operation panel 7 to a position easily visible by the user, as necessary. For example, a stepping motor can be used as the tilt mechanism drive motor.

Figure 4:
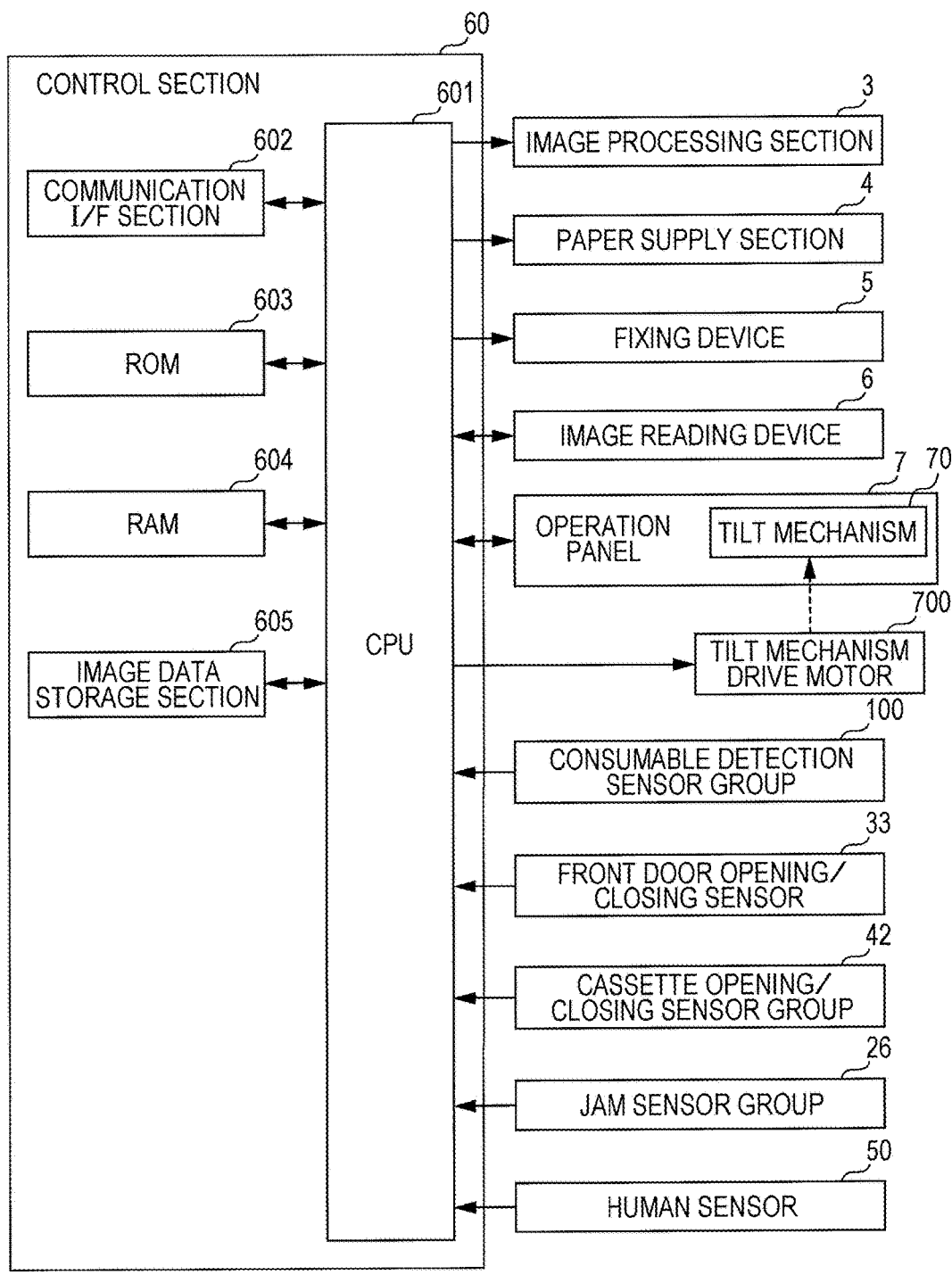
FIG. 4 is a diagram of a relationship among a configuration of a control section and main components targeted for control by the control section.

FIG. 4 is a diagram of a relationship among a configuration of the control section 60 and main components targeted for control by the control section 60. The control section 60 is a so-called computer. As illustrated in FIG. 4, the control section 60 includes, for example, a central processing unit (CPU) 601, a communication interface (I/F) section 602, a read only memory (ROM) 603, a random access memory (RAM) 604, and an image data storage section 605.

The communication I/F section 602 is an interface for connection with the LAN such as a LAN card or a LAN board. The ROM 603 stores, for example, a program for controlling the image processing section 3, the paper supply section 4, the fixing device 5, the image reading device 6, the operation panel 7 having a tilt mechanism 70, a tilt mechanism drive motor 700, a consumable detection sensor group 100, the front door opening/closing sensor 33, a cassette opening/closing sensor group 42, a jam sensor group 26, the human sensor 50, etc., and a program for executing later-described operation panel position control processing.

The consumable detection sensor group 100 described herein indicates a sensor group configured to detect the state of a consumable such as a toner bottle or a record sheet. Specifically, the consumable detection sensor group 100 indicates a sensor group including the toner empty sensors 32Y, 32M, 32C, 32K, the waste toner detection sensor 35, and the paper empty sensors 43A, 43B.

Moreover, the cassette opening/closing sensor group 42 indicates a sensor group including the cassette opening/closing sensors 42A, 42B, and the jam sensor group 26 indicates a sensor group including the jam sensors 26A, 26B, 26C.

The RAM 604 is used as a work area in program execution by the CPU 601. The image data storage section 605 is configured to store the image data for printing, the image data being input via the communication I/F section 602 and the image reading device 6.

The CPU 601 executes various programs stored in the ROM 603, thereby controlling the image processing section 3, the paper supply section 4, the fixing device 5, the image reading device 6, the operation panel 7 having the tilt mechanism 70, the tilt mechanism drive motor 700, the consumable detection sensor group 100, the front door opening/closing sensor 33, the cassette opening/closing sensor group 42, the jam sensor group 26, etc. and executing the later-described operation panel position control processing.

[2] Operation Panel Position Control Processing

Figure 5:
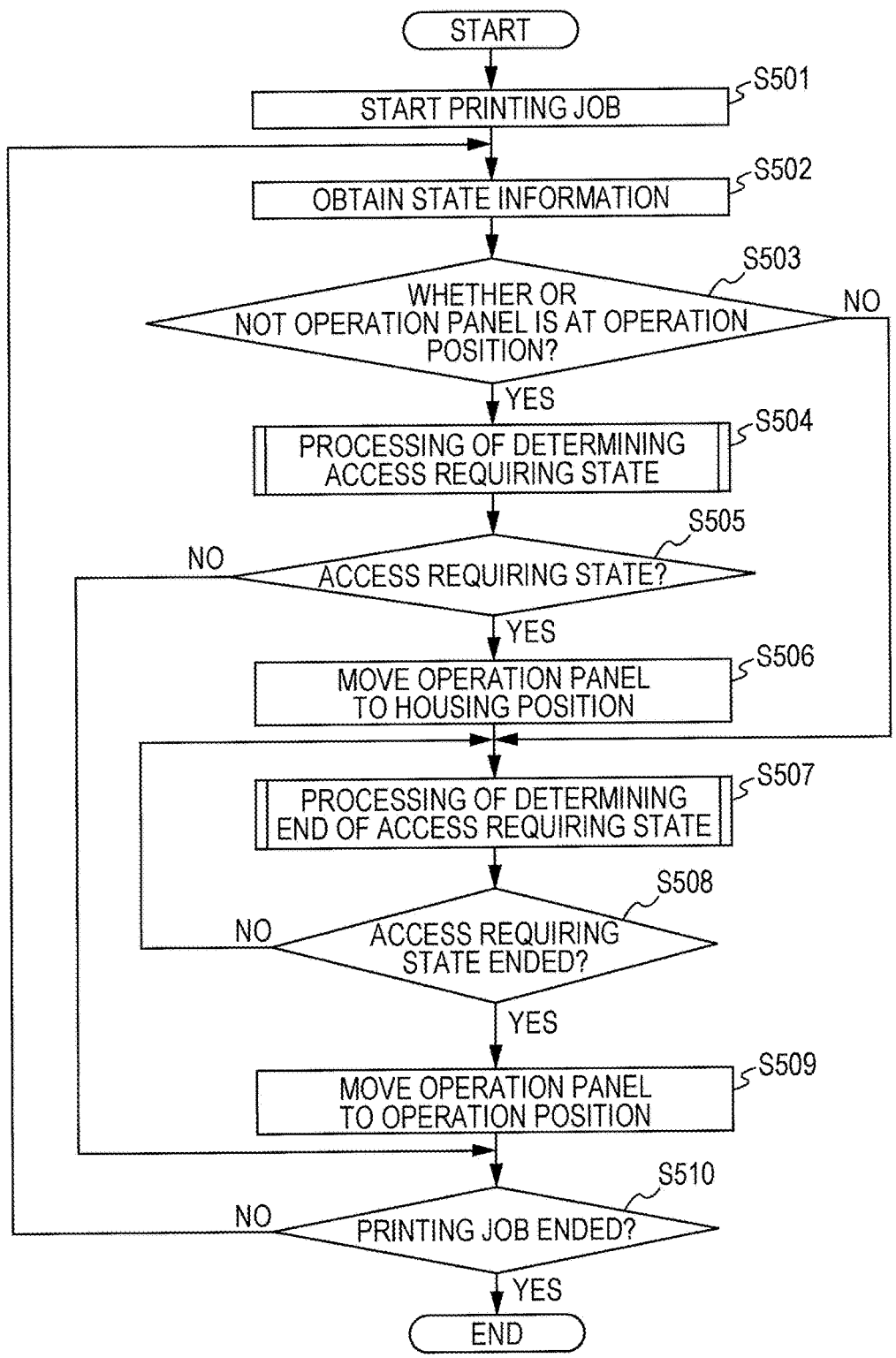
FIG. 5 is a flowchart of operation in operation panel position control processing performed by the control section.

FIG. 5 is a flowchart of operation in the operation panel position control processing performed by the control section 60. When starting execution of a printing job (step S501), the control section 60 obtains state information indicating a current state of the device body (step S502). The state information includes, for example, toner bottle information on whether or not the toner housed in the toner bottle for each color is in an empty state (a toner-empty state), waste toner bottle information on whether or not the waste toner bottle is in a full state, record sheet information on whether or not record sheets are absent (paper-empty) in the paper supply cassettes 41A, 41B, and jam information on whether or not jam occurs. The toner bottle information, the waste toner bottle information, and the record sheet information are obtained via the consumable detection sensor group 100, and the jam information is obtained via the jam sensor group 26.

Next, the control section 60 determines whether or not the operation panel 7 is at the operation position (step S503). At the operation position (YES: step S503), the control section 60 executes the later-described processing of determining a state requiring an access to the device body (step S504).

Then, when a determination result of the above-described processing of determining the state requiring the access shows an access requiring state (a later-described access requiring state flag is ON) (YES: step S505), the control section 60 drives the tilt mechanism drive motor 700 to move the operation panel 7 to the housing position (step S506), and then, executes the later-described processing of determining the end of the access requiring state (step S507).

When a determination result of the above-described processing of determining the end of the access requiring state shows the end of the access requiring state (the later-described access requiring state flag is OFF) (YES: step S508), the control section 60 drives the tilt mechanism drive motor 700 to move the operation panel 7 to the operation position (step S509), and then, repeats the processing of the steps S502 to S509 until the printing job ends (YES: step S510).

When a determination result at the step S503 is negative or a determination result at the step S508 is negative (NO: step S503 or NO: step S508), the control section 60 transitions to the processing of the step S507. When a determination result at the step S505 is negative (NO: step S505), the control section 60 transitions to the processing of the step S510.

Figure 6:
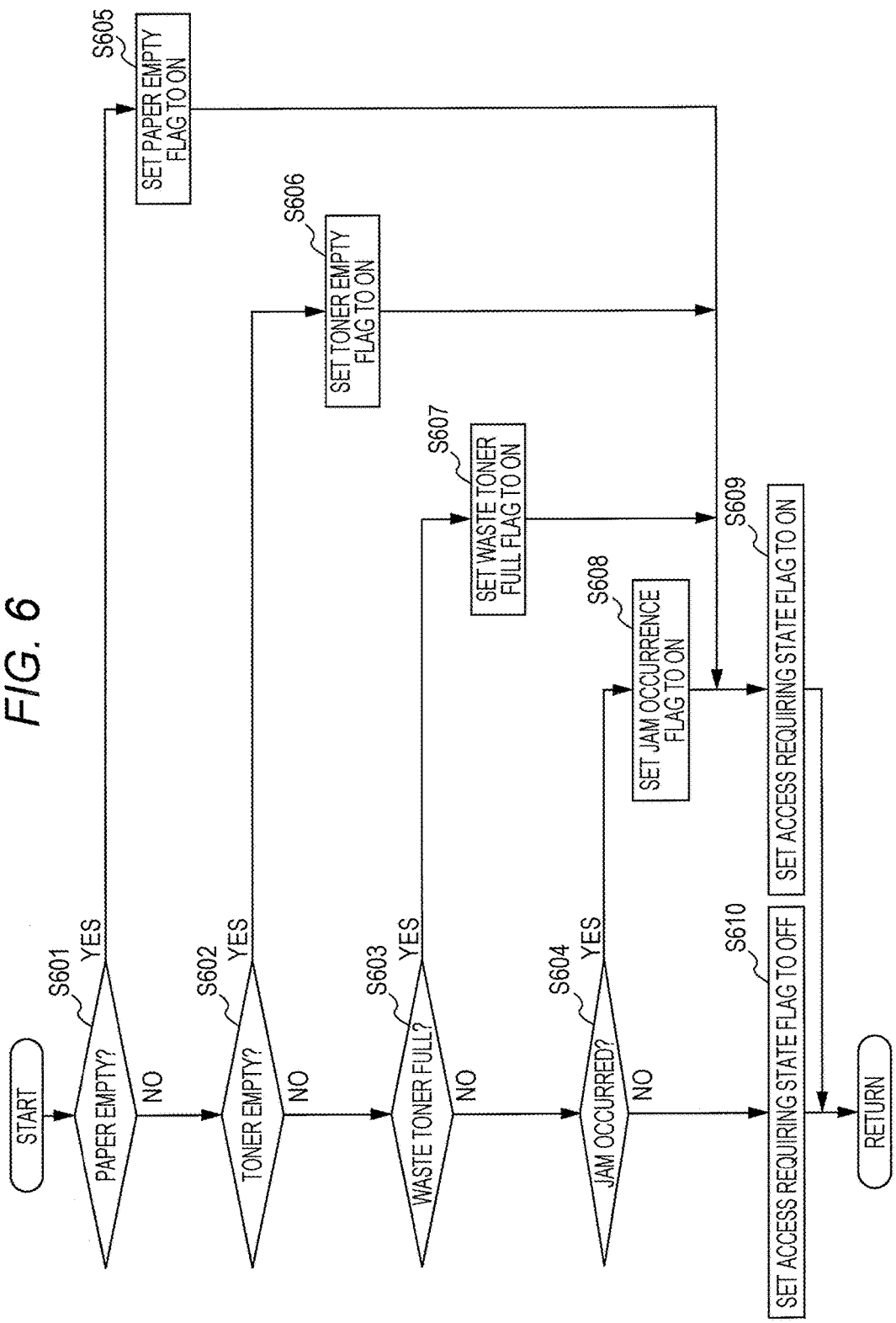
FIG. 6 is a flowchart of operation in the processing of determining a state requiring a user access to a device body.

FIG. 6 is a flowchart of operation in the processing of determining the state requiring the access to the device body. Based on the state information (the record sheet information) obtained at the step S502, the control section 60 determines whether or not at least any of the paper supply cassettes 41A, 41B is paper-empty (step S601).

When a determination result at the step S601 is negative (NO: step S601), the control section 60 further determines, based on the state information (the toner bottle information) obtained at the step S502, whether or not at least any of the toner bottles for the above-described colors is toner-empty (step S602).

When a determination result at the step S602 is negative (NO: step S602), the control section 60 further determines, based on the state information (the waste toner bottle information) obtained at the step S502, whether or not the waste toner of the waste toner bottle 34 is in the full state (step S603).

When a determination result at the step S603 is negative (NO: step S603), the control section 60 further determines, based on the state information (the jam information) obtained at the step S502, whether or not jam occurs (step S604).

When the determination result at the step S601 is positive (YES: step S601), the control section 60 sets a paper empty flag to ON (step S605), the paper empty flag indicating that at least any of the paper supply cassettes 41A, 41B is paper-empty. Further, the control section 60 sets the access requiring state flag to ON (step S609), the access requiring state flag indicating that the state of the device body is the state requiring the user access to the device body.

When the determination result at the step S602 is positive (YES: step S602), the control section 60 sets a toner empty flag to ON (step S606), the toner empty flag indicating that at least any of the toner bottles for the above-described colors is toner-empty. Further, the control section 60 transitions to the processing of the step S609.

When the determination result at the step S603 is positive (YES: step S603), the control section 60 sets a waste toner full flag to ON (step S607), the waste toner full flag indicating that the waste toner in the waste toner bottle 34 is in the full state. Further, the control section 60 transitions to the processing of the step S609.

When a determination result at the step S604 is positive (YES: step S604), the control section 60 sets a jam occurrence flag to ON (step S608), the jam occurrence flag indicating that jam occurs in the record sheet delivery path. The control section 60 further transitions to the processing of the step S609.

When any of the determination results at the steps S601, S602, S603, S604 is negative (NO: step S601, NO: step S602, NO: step S603, NO: step S604), the control section 60 sets the access requiring state flag to OFF (step S610).

Note that when any of the determination results at the steps S601 to S604 is positive (the determination result at the step S505 is positive), the control section 60 displays, on the operation panel 7, the information on the state information in positive determination (e.g., when the waste toner bottle 34 is in the full state (YES: step S603), a message indicating such a state, information indicating the position of the waste toner bottle 34, and information indicating the method for replacing the waste toner bottle 34). Such relevant information is displayed on the operation panel 7 until it is, at the step S508 of FIG. 5, determined that the access requiring state has ended (YES: step S508).

Figure 7:
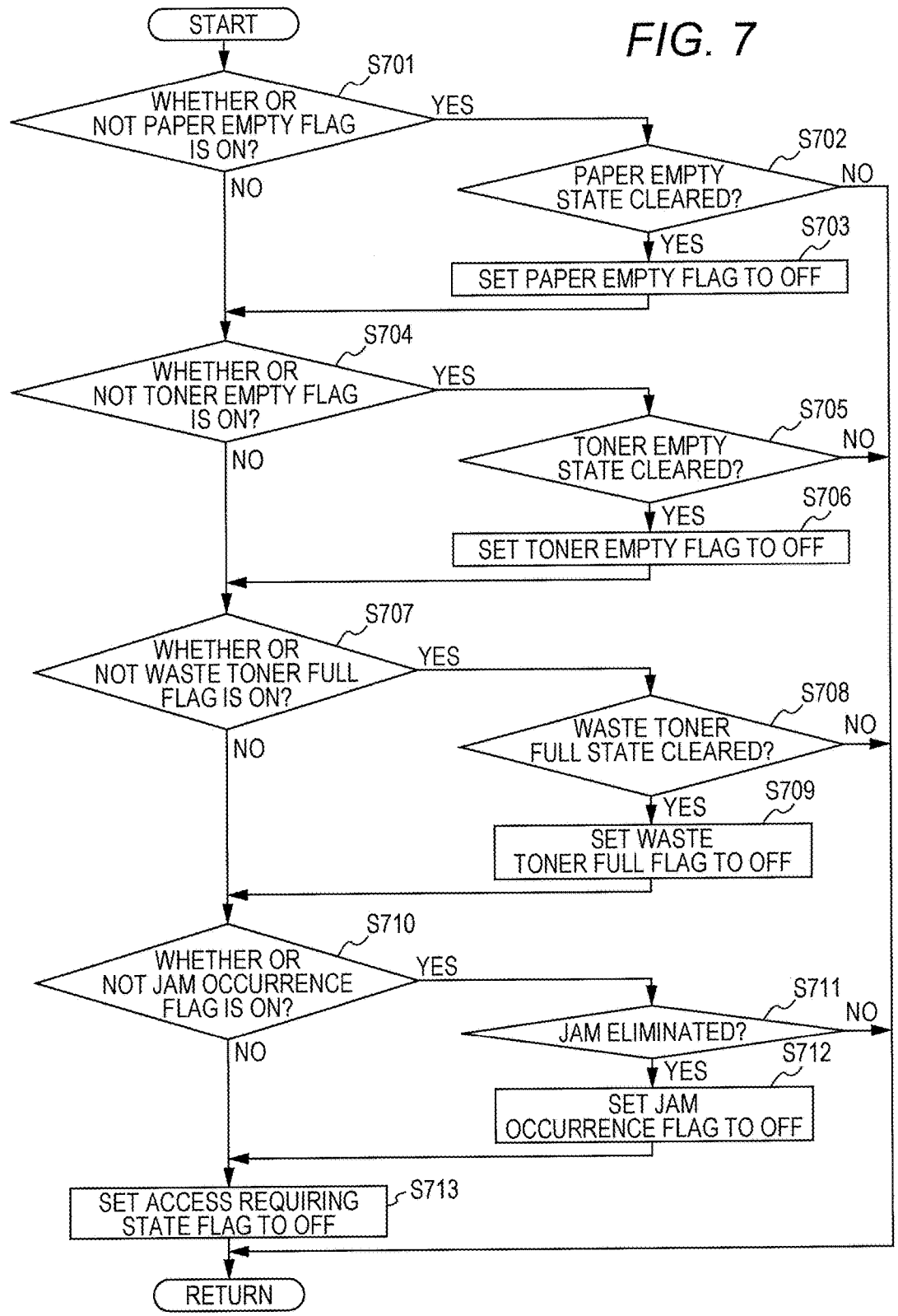
FIG. 7 is a flowchart of operation in the processing of determining the end of the access requiring state.

FIG. 7 is a flowchart of operation in the processing of determining the end of the access requiring state. The control section 60 determines whether or not the paper empty flag is ON (step S701). When the paper empty flag is ON (YES: step S701), current state information (the record sheet information) is obtained. Then, based on the obtained state information, it is determined whether or not a paper empty state is cleared (the record sheet information indicates that any of the paper supply cassettes 41A, 41B is not paper-empty and that detection results of the cassette opening/closing sensor group 42 show that the paper supply cassettes 41A, 41B are in the "closed state") (step S702).

Then, when the paper empty state is cleared (YES: step S702), the control section 60 sets the paper empty flag to OFF (step S703), and determines whether or not the toner empty flag is ON (step S704). When the toner empty flag is ON (YES: step S704), the control section 60 obtains current state information (the toner bottle information). Then, based on the obtained state information, it is determined whether or not a toner empty state is cleared (the toner bottle information indicates that the toner bottles for all colors are not toner-empty and that detection results of the front door opening/closing sensor 33 show a "closed state") (step S705).

Then, when the toner empty state is cleared (YES: step S705), the control section 60 sets the toner empty flag to OFF (step S706), and determines whether or not the waste toner full flag is ON (step S707). When the waste toner full flag is ON (YES: step S707), current state information (the waste toner bottle information) is obtained. Then, based on the obtained state information, it is determined whether or not a waste toner full state is cleared (the waste toner bottle information indicates that the waste toner bottle is not in the full state and that the detection result of the front door opening/closing sensor 33 shows the "closed state") (step S708).

Then, when the waste toner full state is cleared (YES: step S708), the control section 60 sets the waste toner full flag to OFF (step S709), and determines whether or not the jam occurrence flag is ON (step S710). When the jam occurrence flag is ON (YES: step S710), current state information (the jam information) is obtained. Then, based on the obtained state information, it is determined whether or not jam is cleared (the jam information indicates that jam does not occur and that the detection result of the front door opening/closing sensor 33 shows the "closed state") (step S711).

Then, when jam is cleared (YES: step S711), the control section 60 sets the jam occurrence flag to OFF (step S712), and sets the access requiring state flag to OFF (step S713).

When a determination result at the step S701 is negative (NO: step S701), the control section 60 transitions to the processing of the step S704. When a determination result at the step S704 is negative (NO: step S704), the control section 60 transitions to the processing of the step S707. When a determination result at the step S707 is negative (NO: step S707), the control section 60 transitions to the processing of the step S710.

As described above, according to the present embodiment, in the image formation device 1 configured such that the operation panel 7 protrudes from the device body, it is, based on the state information indicating the state of the device body, whether or not the user requires the access to the device body and whether or not the operation panel 7 is at the operation position. When both determination results are positive, control is made such that the operation panel 7 moves from the operation position to the housing position. Thus, when the user accesses to the device body, the operation panel 7 less interferes with the user, and the user less contacts the operation panel 7.

Based on the state information, it is determined whether or not the state requiring the user access to the device body has ended. When the state requiring the access has ended, control is made such that the operation panel 7 moves to the operation position easily operable by the user. Thus, after the end of the state requiring the access, there is no disadvantage in operability of the operation panel 7 by the user.

(Variations)

The present invention has been described above with reference to the embodiment of the present invention. Needless to say, the present invention is not limited to the above-described embodiment, and the following variations can be implemented.

(1) Based on the toner bottle information, the waste toner bottle information, the record sheet information, and the jam information, it is, in the above-described embodiment, determined whether or not the state of the device body is the state requiring the user access to the device body. However, instead of each type of information described above, the state information may include cassette information on whether or not the paper supply cassettes 41A, 41B are in an open state, and front door information on whether or not the front door 30A is in an open state. Base on the cassette information and the front door information, it may be determined whether or not the user is accessing to the device body. In the present variation, the cassette information is obtained via the cassette opening/closing sensor group 42, and the front door information is obtained via the front door opening/closing sensor 33.

Figure 8:
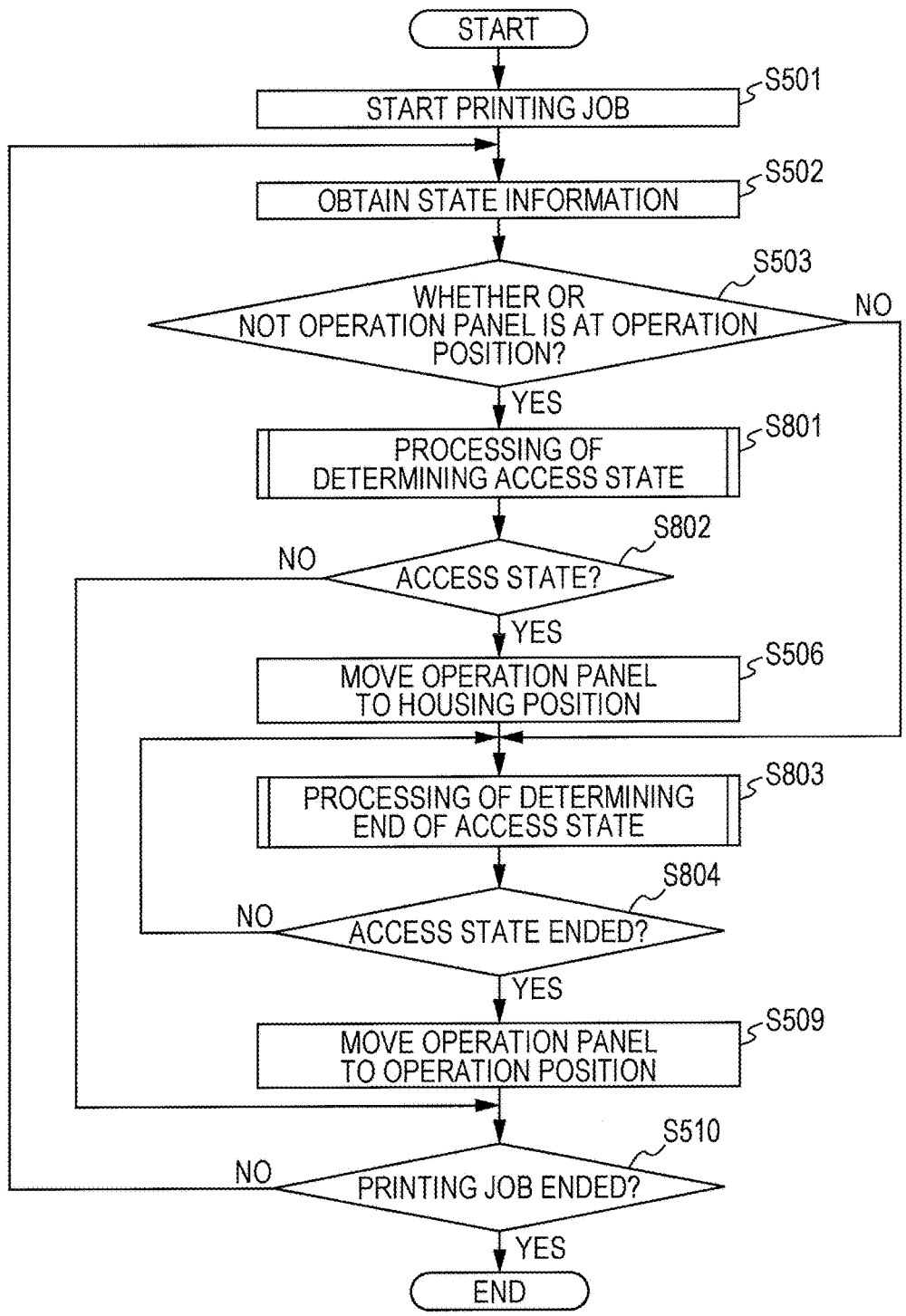
FIG. 8 is a flowchart of a first variation of operation in the operation panel position control processing performed by the control section.
Figure 9:
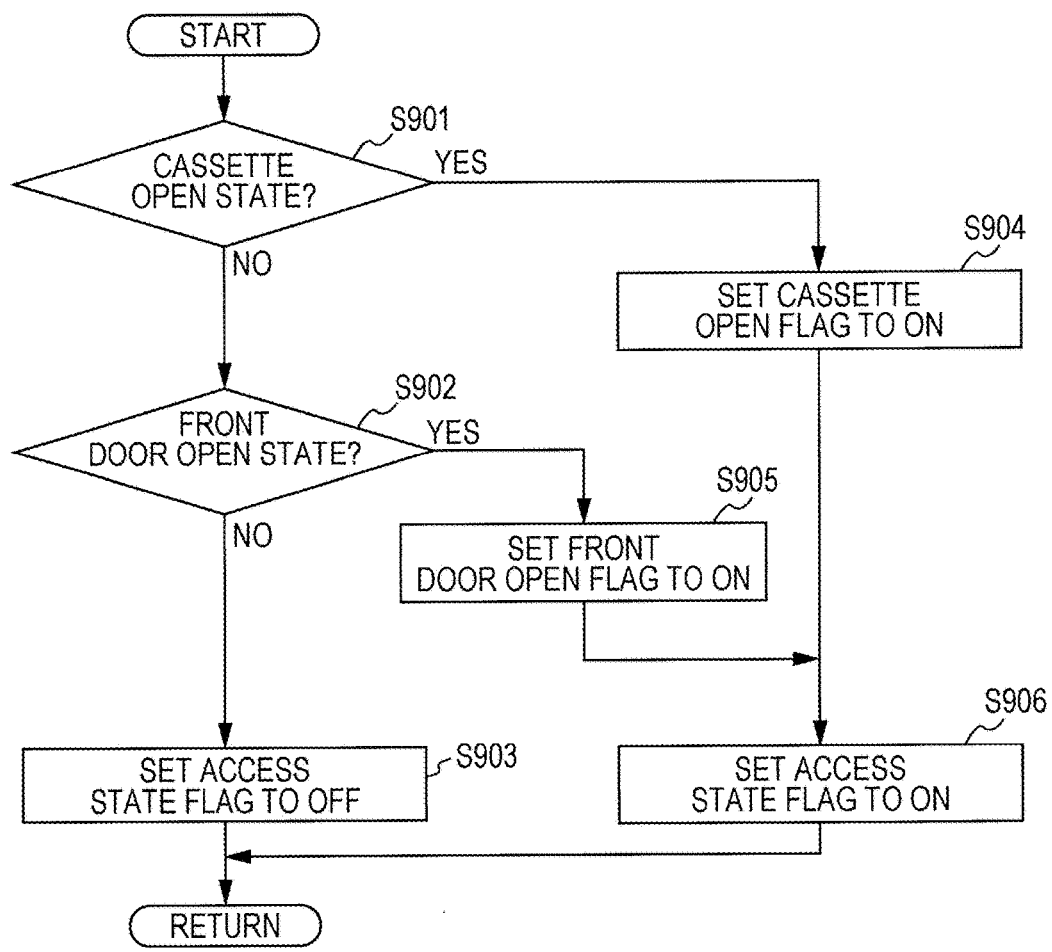
FIG. 9 is a flowchart of operation in the processing of determining the state of accessing to the device body.
Figure 10:
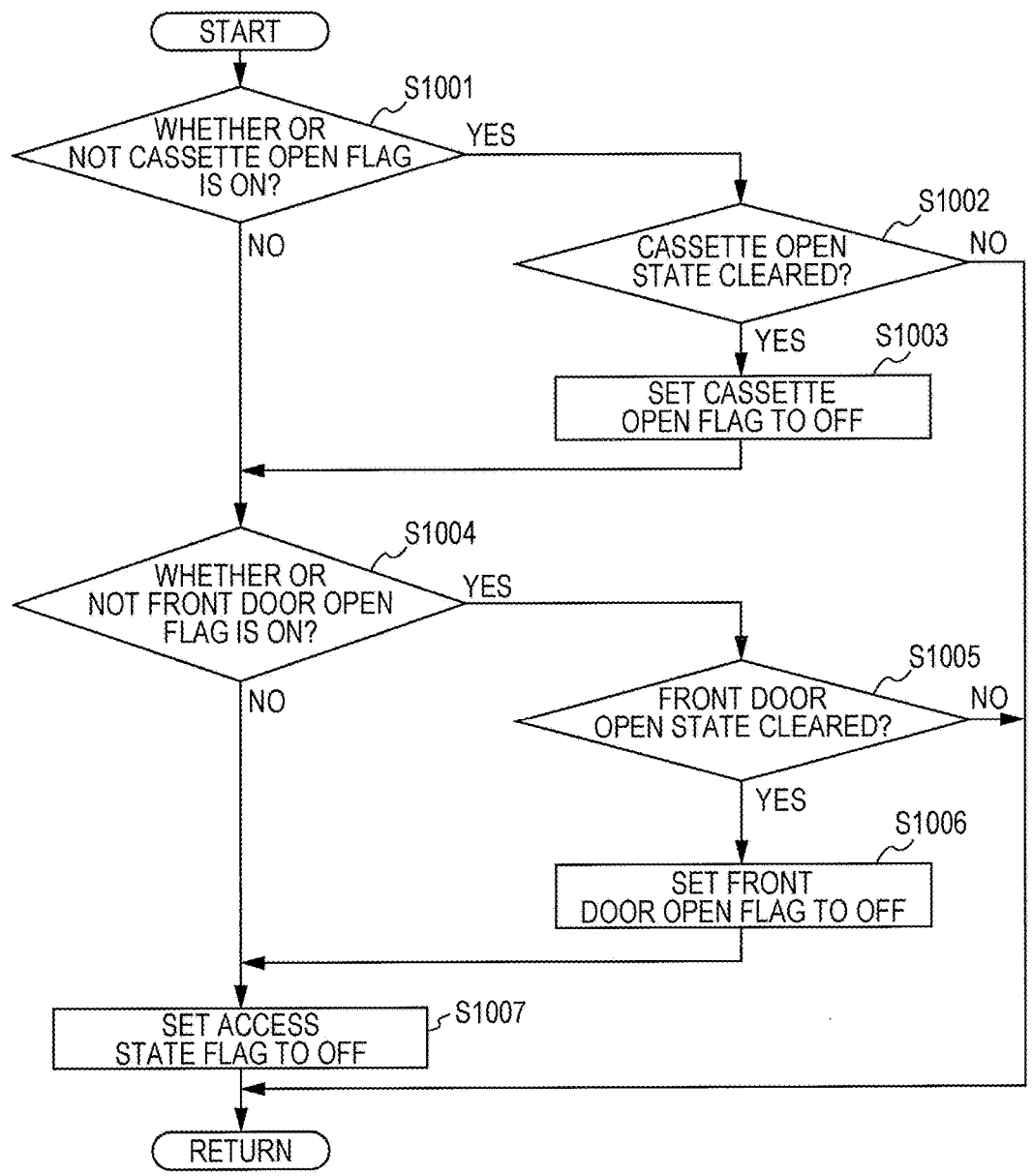
FIG. 10 is a flowchart of operation in the processing of determining the end of the access state.

Specifically, operation in the operation panel position control processing of FIG. 5, operation in the processing of determining the state requiring the access to the device body as shown in FIG. 6, and operation in the processing of determining the end of the access requiring state may be changed to operation as in FIGS. 8, 9, and 10.

In operation in the operation panel position control processing of the present variation as shown in FIG. 8, the same step numbers as those of the processing of FIG. 5 are used to represent equivalent processing contents, and description thereof will not be repeated. Differences will be mainly described below.

When the determination result at the step S503 is positive (YES: step S503), the control section 60 executes the later-described processing of determining the state of accessing to the device body (step S801). When a determination result of the above-described processing of determining the access state shows an access state (a later-described access state flag is ON) (YES: step S802), the control section 60 transitions to the processing of the step S506, and then, executes the later-described processing of determining the end of the access state (step S803). When a determination result at the step S803 shows the end of the access state (the later-described access state flag is OFF) (YES: step S804), the control section 60 transitions to the processing of the step S509.

When the determination result at the step S503 is negative or when a determination result at the step S804 is negative (NO: step S503 or NO: step S804), the control section 60 transitions to the processing of the step S803.

Next, operation in the processing of determining the access state as shown in FIG. 9 will be described. Based on the state information (the cassette information) obtained at the step S502, the control section 60 determines whether or not at least any of the paper supply cassettes 41A, 41B is in the open state (hereinafter referred to as a "cassette open state") (step S901).

When a determination result at the step S901 is negative (NO: step S901), the control section 60 further determines, based on the state information (the front door information) obtained at the step S502, whether or not the front door 30A is in the open state (step S902).

When the determination result at the step S901 is positive (YES: step S901), the control section 60 sets a cassette open flag to ON (step S904), the cassette open flag indicating that at least any of the paper supply cassettes 41A, 41B is in the open state. Moreover, the control section 60 sets the access state flag to ON (step S906), the access state flag indicating that the user is accessing to the device body.

When a determination result at the step S902 is positive (YES: step S902), the control section 60 sets a front door open flag to ON (step S905), the front door open flag indicating that the front door 30A is in the open state. Then, the control section 60 transitions to the processing of the step S906.

When any of the determination results at the steps S901 and S902 is negative (NO: step S901 and NO: step S902), the control section 60 sets the access state flag to OFF (step S903).

Note that as in the above-described embodiment, when the determination result at the step S901 or S902 is positive (a determination result at the step S802 is positive), the control section 60 displays, on the operation panel 7, information on the state information in positive determination (e.g., when the front door 30A is in the open state (YES: step S902), a message indicating such a state, information indicating the position of the front door 30A, and a message prompting closing of the front door 30A). Such relevant information is displayed on the operation panel 7 until it is, at the step S804 of FIG. 8, determined that the access state has ended (YES: step S804).

Next, operation in the processing of determining the end of the access state as shown in FIG. 10 will be described. The control section 60 determines whether or not the cassette open flag is ON (step S1001). When the cassette open flag is ON (YES: step S1001), the control section 60 obtains current state information (the cassette information). Then, based on the obtained state information, the control section 60 determines whether or not the cassette open state is cleared (the cassette information shows that any of the paper supply cassettes 41A, 41B is not in the open state) (step S1002).

When the cassette open state is cleared (YES: step S1002), the control section 60 sets the cassette open flag to OFF (step S1003), and determines whether or not the front door open flag is ON (step S1004). When the front door open flag is ON (YES: step S1004), the control section 60 obtains current state information (the front door information). Then, based on the obtained state information, the control section 60 determines whether or not a front door open state is cleared (the front door information shows that the front door 30A is not in the open state) (step S1005).

When the front door open state is cleared (YES: step S1005), the control section 60 sets the front door open flag to OFF (step S1006), and sets the access state flag to OFF (step S1007).

In the present variation, when the front door 30A is not disposed on the front side of the device body, but is disposed on a lateral side of the device body, the processing of FIGS. 8 to 10 may be similarly performed. In this case, when the front door 30A is in the open state, even if the operation panel 7 does not move to the housing position, the operation panel 7 does not directly interfere with the user working through the opened front door 30A. Moreover, while the user is working, interference with a person walking by the side of the image formation device 1 can be prevented. The case where the paper supply cassettes 41A, 41B are, instead of the front door 30A, not disposed on the front side of the device body, but are disposed on the lateral side of the device body is similar to the case where the front door 30A is disposed on the lateral side.

Alternatively, when the front door 30A is disposed on the lateral side, the processing of the steps S902 and S905 in operation in the operation panel position control processing of FIG. 9 and the processing of the steps S1004 to S1006 in operation in the processing of determining the access state as shown in FIG. 10 may be skipped, and control may be made such that the operation panel 7 is held at the operation position even when the front door 30A is in the open state. With such control, the operation panel 7 can be maintained at the operation position providing favorable operability, and the operation panel 7 can be operated from the operation position right after completion of user's work. Thus, lowering of the operability of the operation panel can be prevented. Moreover, the case where the paper supply cassettes 41A, 41B are, instead of the front door 30A, not disposed on the front side of the device body, but are disposed on the lateral side of the device body is similar to the case where the front door 30A is disposed on the lateral side.

Further, in the case of an image formation device configured such that doors for consumable replacement/resupply or jam processing are disposed on other sides than the front side of the device body, processing similar to the processing for the front door 30A in the present variation may be performed for each door. Alternatively, for the doors other than the door on the front side of the device body, control may be, without performing the processing similar to the processing for the front door 30A in the present variation, made such that the operation panel 7 is held at the operation position even when the doors are in an open state.

(2) In the embodiment and the variation (1) as described above, when the state requiring the user access to the device body has ended, control is made such that the operation panel 7 moves to the operation position. However, when the above-described state has ended and the human sensor 50 has detected that the operator is near the operation panel 7, control may be made such that the operation panel 7 moves to the operation position.

Figure 11:
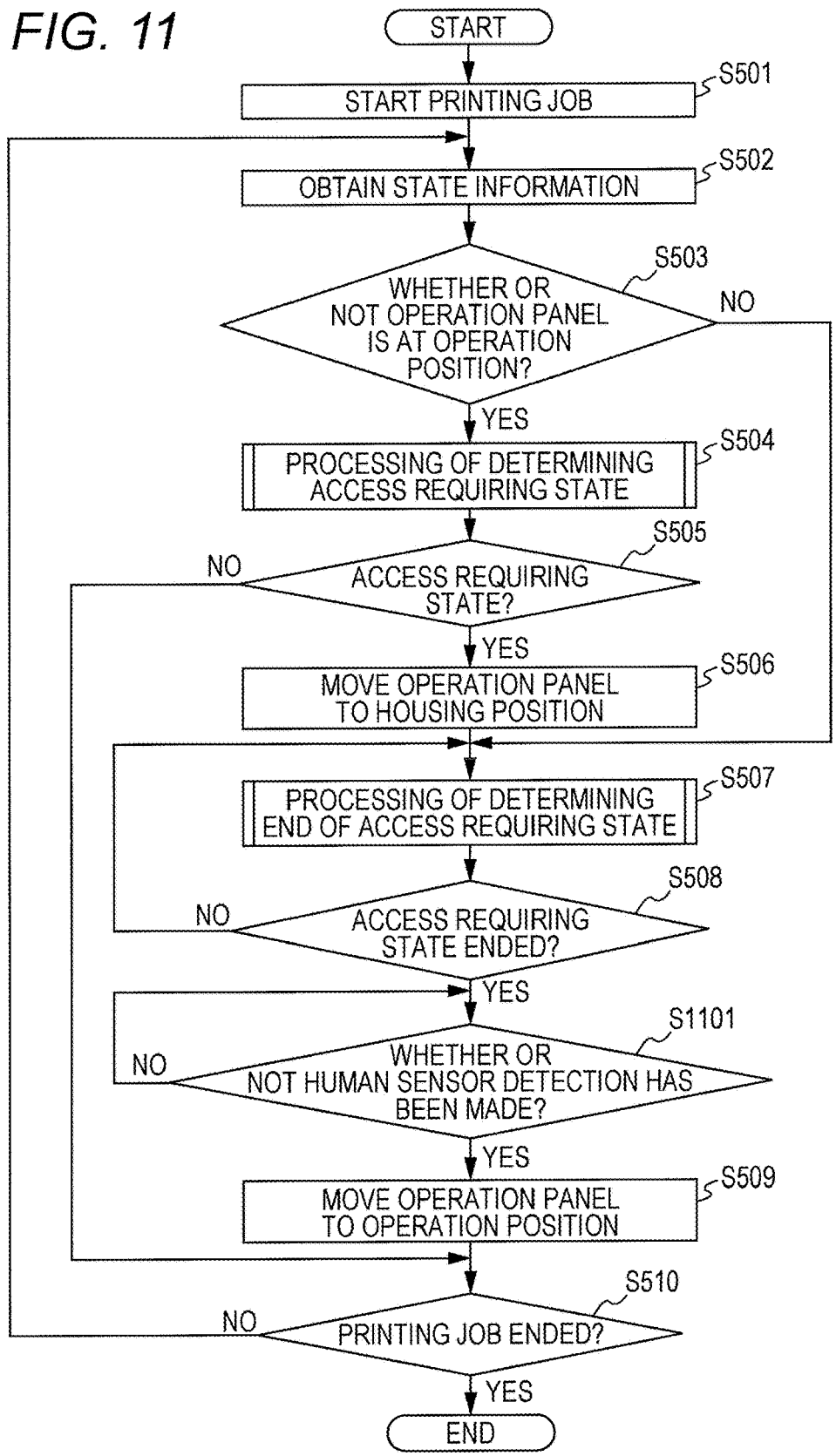
FIG. 11 is a flowchart of a second variation of operation in the operation panel position control processing performed by the control section.

Specifically, operation in the operation panel position control processing of FIGS. 5 and 8 in the embodiment and the variation (1) as described above may be changed to operation as in FIGS. 11 and 12. In FIG. 11, the same step numbers as those of the processing of FIG. 5 are used to represent equivalent processing contents, and description thereof will not be repeated. Differences will be mainly described below.

When the determination result at the step S508 is positive (YES: step S508), the control section 60 further determines whether or not the human sensor 50 has detected that the operator is near the operation panel 7 (step S1101). When detected (YES: step S1101), the control section 60 transitions to the processing of the step S509.

Figure 12:
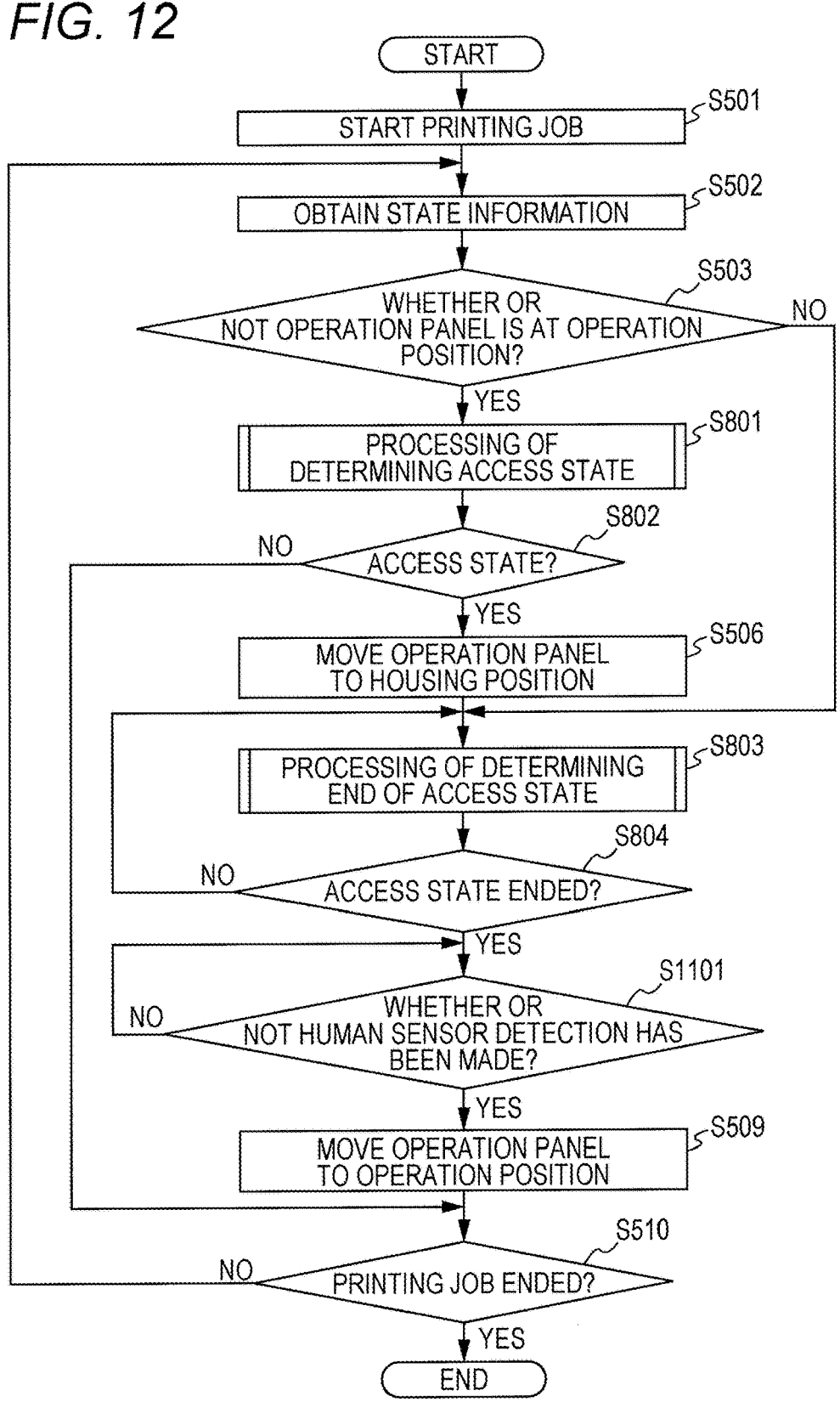
FIG. 12 is a flowchart of a third variation of operation in the operation panel position control processing performed by the control section.

Similarly, in FIG. 12, the same step numbers as those of the processing of FIG. 8 are used to represent equivalent processing contents, and description thereof will not be repeated. Differences will be mainly described below. When the determination result at the step S804 is positive (YES: step S804), the control section 60 further determines whether or not the human sensor 50 has detected that the operator is near the operation panel 7 (step S1101). When detected (YES: step S1101), the control section 60 transitions to the processing of the step S509.

This configuration can prevent the following interference: the operation panel 7 moves to the operation position after the state requiring the user access to the device body or the state of accessing to the device body has ended and before the user returns to a position near the operation panel 7, and as a result, the operation panel 7 interferes with the user when the user returns to the above-described nearby position.

(3) Instead of using a detection result of the human sensor 50, time may be, in the variation (2), measured after the state requiring the user access to the device body has ended, and the operation panel 7 may move to the operation position when the measured time reaches predetermined time.

Figure 13:
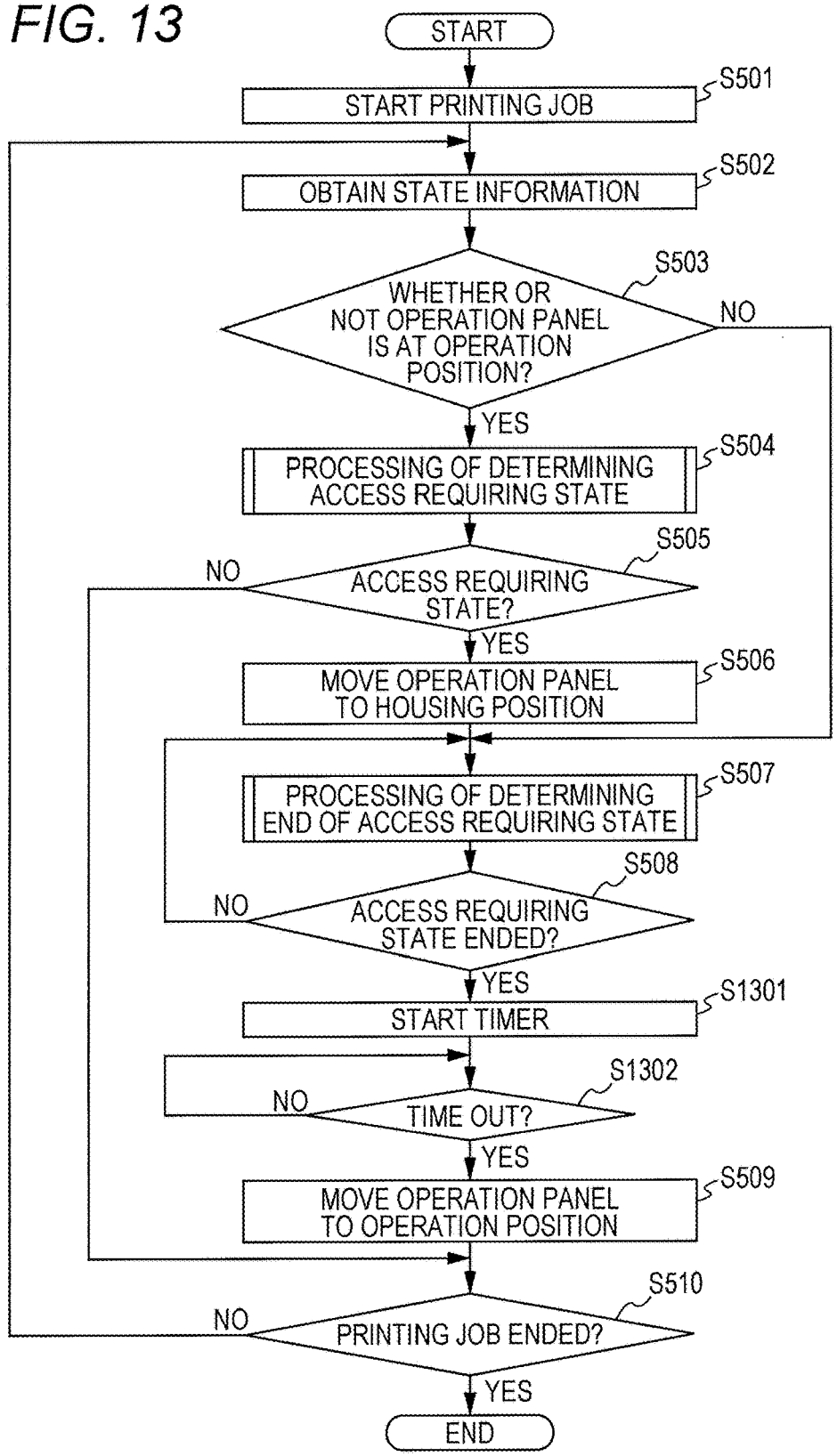
FIG. 13 is a flowchart of a fourth variation of operation in the operation panel position control processing performed by the control section.
Figure 14:
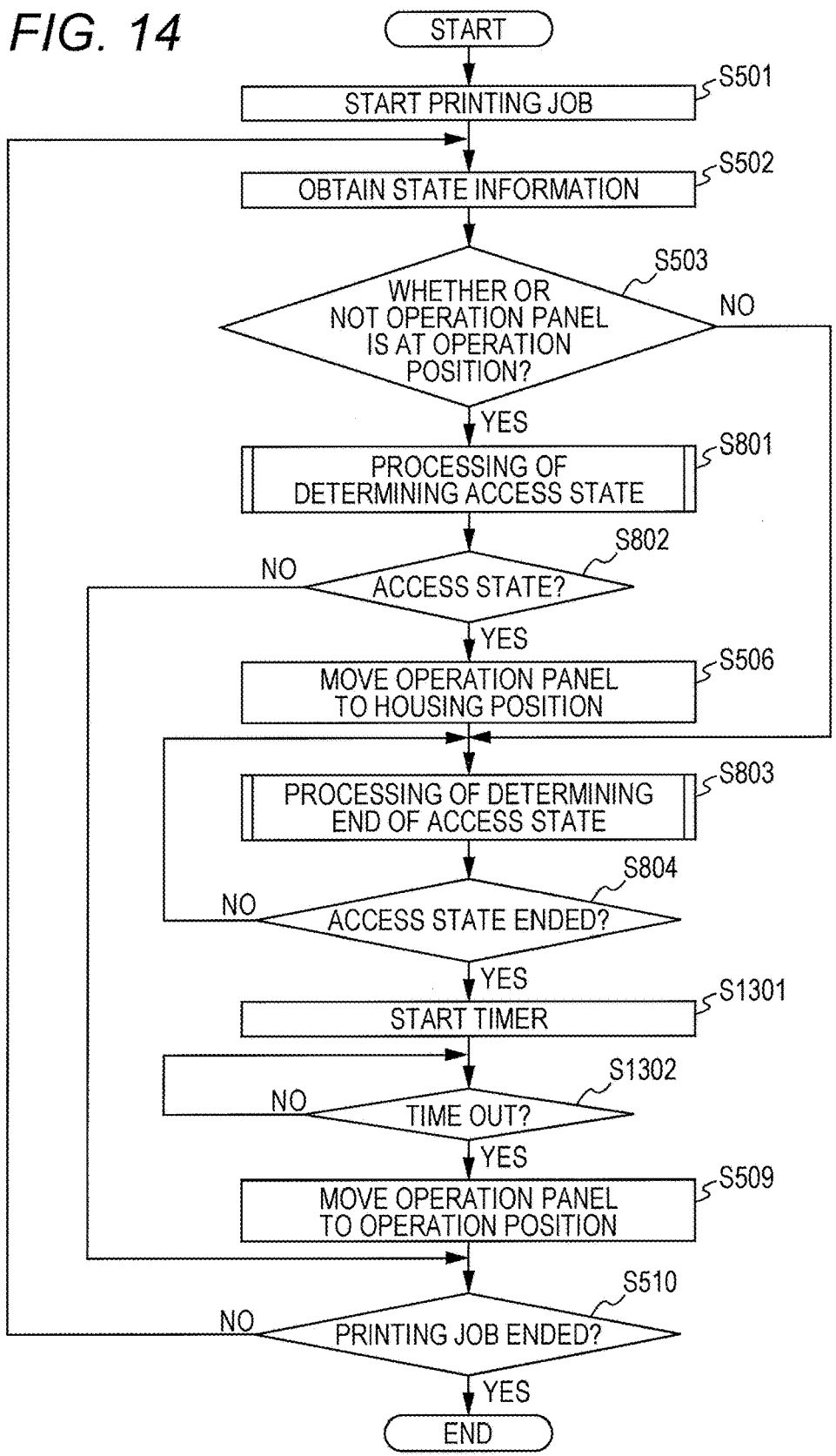
FIG. 14 is a flowchart of a fifth variation of operation in the operation panel position control processing performed by the control section.

Specifically, operation in the operation panel position control processing of FIGS. 5 and 8 in the above-described embodiment may be changed to operation as in FIGS. 13 and 14. In FIG. 13, the same step numbers as those of the processing of FIG. 5 are used to represent equivalent processing contents, and description thereof will not be repeated. Differences will be mainly described below.

When the determination result at the step S508 is positive (YES: step S508), the control section 60 further starts a timer (step S1301). After the start of the timer, when the timer times out after a lapse of predetermined time (e.g., 20 seconds) (YES: step S1302), the control section 60 transitions to the processing of the step S509.

Similarly, in FIG. 14, the same step numbers as those of the processing of FIG. 8 are used to represent equivalent processing contents, and description thereof will not be repeated. Differences will be mainly described below. When the determination result at the step S804 is positive (YES: step S804), the control section 60 further starts the timer (step S1301). After the start of the timer, when the timer times out after a lapse of the predetermined time (e.g., 20 seconds) (YES: step S1302), the control section 60 transitions to the processing of the step S509.

With this configuration, control is made such that the operation panel 7 moves from the operation position to the housing position after a lapse of the predetermined time after the state requiring the user access to the device body or the state of accessing to the device body has ended. This can prevent the following interference: the operation panel 7 moves to the operation position right after the above-described state has ended, and as a result, the operation panel 7 interferes with the user when the user returns to the position of the operation panel 7.

Figure 15:
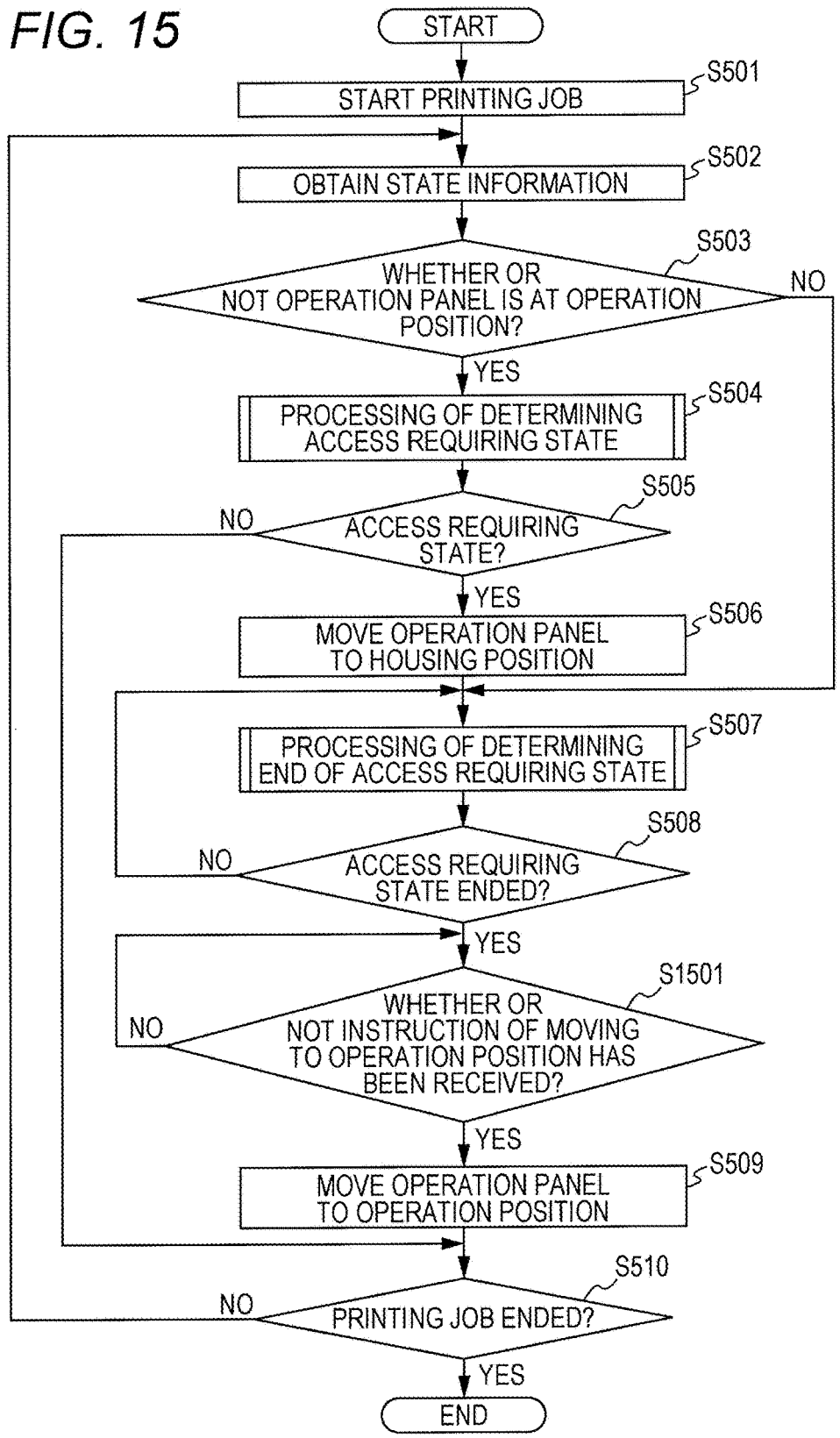
FIG. 15 is a flowchart of a sixth variation of operation in the operation panel position control processing performed by the control section.

(4) Instead of using the detection result of the human sensor 50, the operation panel 7 may, in the variation (2), move to the operation position when the user inputs the instruction of moving the operation panel 7 to the operation position after the state requiring the user access to the device body has ended. Specifically, operation in the operation panel position control processing of FIGS. 5 and 8 in the above-described embodiment may be changed to operation as in FIGS. 15 and 16. In FIG. 15, the same step numbers as those of the processing of FIG. 5 are used to represent equivalent processing contents, and description thereof will not be repeated. Differences will be mainly described below.

When the determination result at the step S508 is positive (YES: step S508), if the control section 60 receives, from the operation panel 7, the instruction of moving the operation panel 7 to the operation position (YES: step S1501), the control section 60 further transitions to the processing of the step S509.

Figure 16:
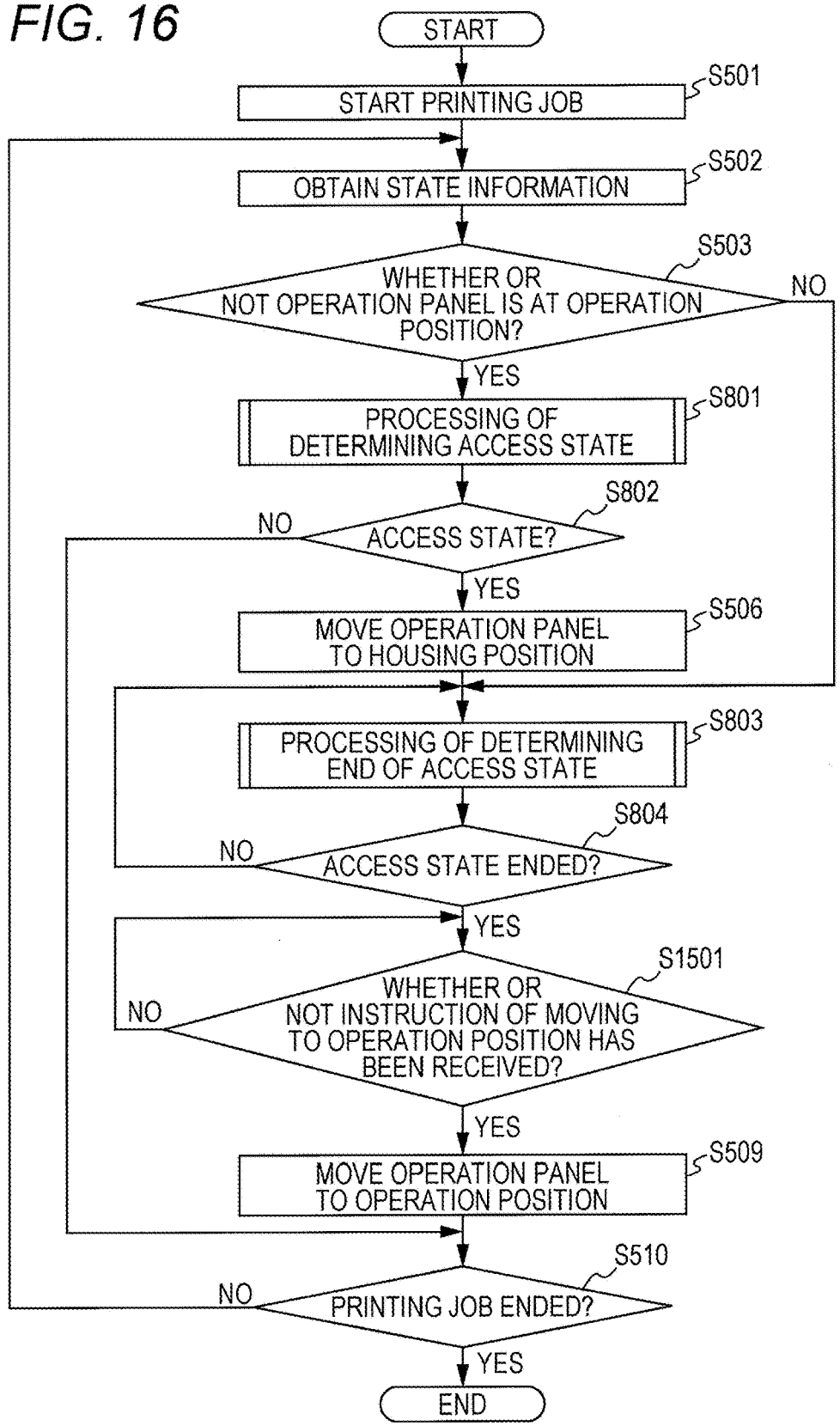
FIG. 16 is a flowchart of a seventh variation of operation in the operation panel position control processing performed by the control section.

Similarly, in FIG. 16, the same step numbers as those of the processing of FIG. 8 are used to represent equivalent processing contents, and description thereof will not be repeated. Differences will be mainly described below. When the determination result at the step S804 is positive (YES: step S804), if the control section 60 receives, from the operation panel 7, the instruction of moving the operation panel 7 to the operation position (YES: step S1501), the control section 60 further transitions to the processing of the step S509.

With this configuration, control is made such that the operation panel 7 moves from the housing position to the operation position when the operation panel 7 inputs the instruction of moving the operation panel 7 to the operation position after the state requiring the user access to the device body or the state of accessing to the device body has ended. This can prevent the following interference: the operation panel 7 moves to the operation position before the user returns to the position of the operation panel 7, and as a result, the operation panel 7 interferes with the user when the user returns to the position of the operation panel 7.

(5) In the above-described embodiment, when at least any of the paper supply cassettes 41A, 41B is paper-empty in operation in the processing of determining the state requiring the access to the device body as shown in FIG. 6, the access requiring state flag is set to ON, and then, the operation panel 7 moves to the housing position. However, when only one of the paper supply cassettes 41A, 41B is paper-empty and the paper size of each record sheet in the paper-empty paper supply cassette is the same as that in the paper supply cassette which is not paper-empty, the operation panel 7 may move to the housing position only if all of the paper supply cassettes are paper-empty.

Note that the size of paper housed in each of the paper supply cassettes 41A, 41B is, for example, input via the operation panel 7 by the user, and the control section 60 stores such a paper size in association with the paper supply cassette.

Figure 17:
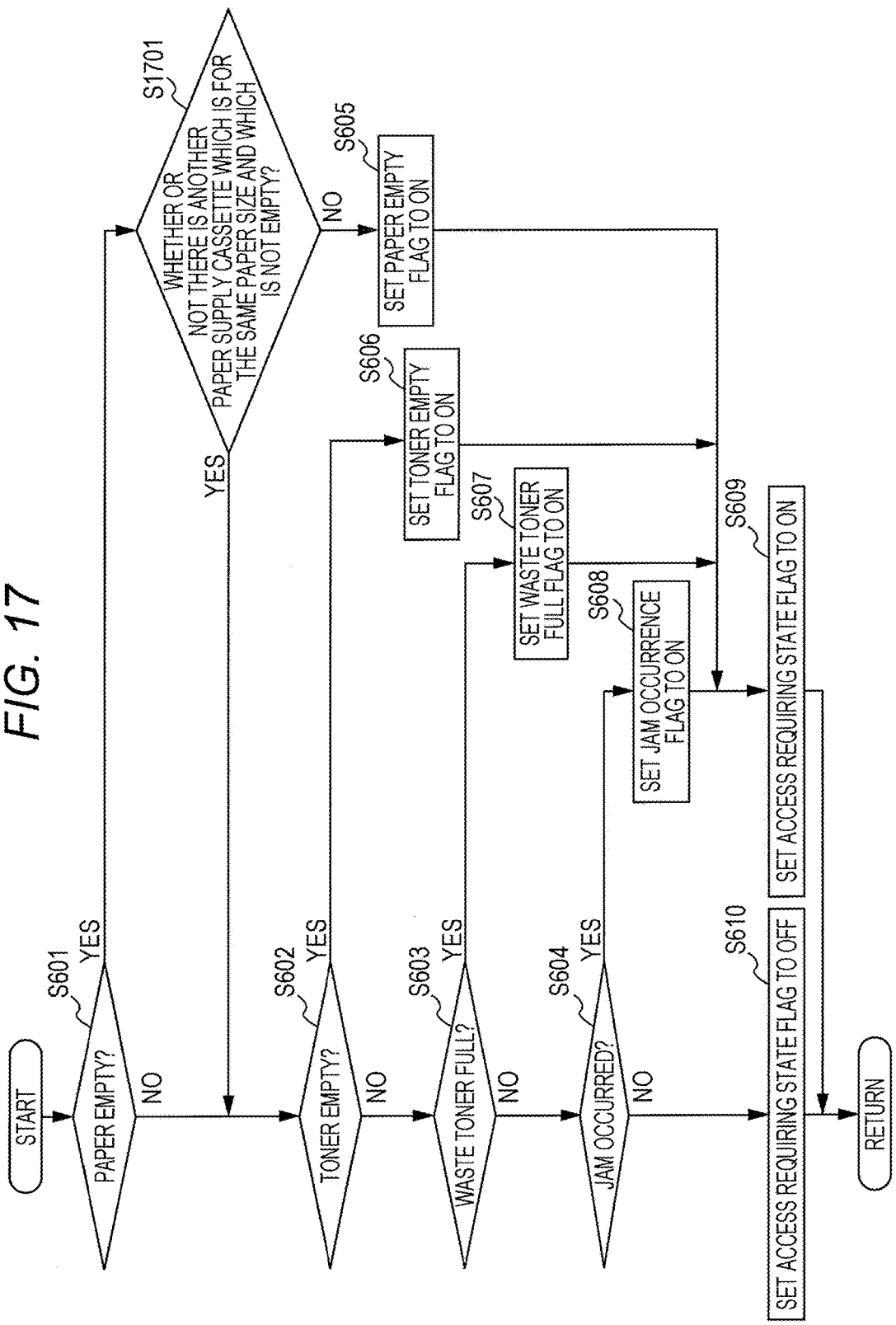
FIG. 17 is a flowchart of a second variation of operation in the processing of determining the state requiring the access to the device body.

Specifically, operation in the above-described processing of determining the access requiring state as shown in FIG. 6 may be changed to operation as in FIG. 17. In FIG. 17, the same step numbers as those of the processing of FIG. 6 are used to represent equivalent processing contents, and description thereof will not be repeated. Differences will be mainly described below.

When the determination result at the step S601 is positive (YES: step S601), the control section 60 determines whether or not there is another paper supply cassette which is for the same paper size as that of a record sheet for the printing job in execution and which is not paper-empty (step S1701). When a determination result at the step S1701 is negative (NO: step S1701), the control section 60 transitions to the processing of the step S605.

When the determination result at the step S1701 is positive (YES: step S1701), the control section 60 transitions to the processing of the step S602.

With this configuration, even when the paper supply cassette housing record sheets becomes paper-empty, if record sheets having the same paper size as that of the record sheet for the printing job in execution are housed in another paper supply cassette, the position of the operation panel 7 can be maintained at the operation position.

As a result, when it is desired to continue the printing job without the user's paper resupply operation of supplying record sheets from another paper supply cassette which is not paper-empty, the instruction and operation of easily switching the paper supply cassette can be made from the operation position. Thus, the printing job can be continued without moving the operation panel to the housing position. As a result, lowering of the operability of the operation panel by the user can be prevented in the paper empty state.

Note that in FIG. 17, when the determination result at the step S1701 is positive (YES: step S1701), the control section 60 may perform the processing of displaying, on the operation panel 7, a selection screen for selection on whether or not the paper supply cassette is to be switched to another paper supply cassette which is not paper-empty. When the user selects to switch the paper supply cassette, the control section 60 may transition to the processing of the step S602. When the user does not select to switch the paper supply cassette, the control section 60 may transition to the processing of the step S605.

(6) In the above-described embodiment, when at least any of the toner bottles for the above-described colors is toner-empty in operation in the processing of determining the state requiring the access to the device body as shown in FIG. 6, the access requiring state flag is set to ON, and then, the operation panel 7 moves to the housing position. However, in the case where the image formation device 1 has the function of performing printing in a subtractive color printing mode (e.g., a two-color mode or a single-color mode) in which the types of color are reduced, a mode in which printing can be performed using toner in other colors than a color for which toner has become empty may be selected.

That is, when the user selects the above-described mode, control may be made, without the above-described settings, such that the operation panel 7 does not move to the housing position.

The "two-color mode" described herein means a mode in which the printing processing is performed using toner in two colors of black and a color other than black, and the color other than black can be selected by the user. For example, when toner in yellow has become empty, the user can select any of magenta and cyan.

Moreover, the "single-color mode" means a mode in which the printing processing is performed using toner in a single color, and the user can select other colors than a color for which the toner has become empty.

Figure 18:
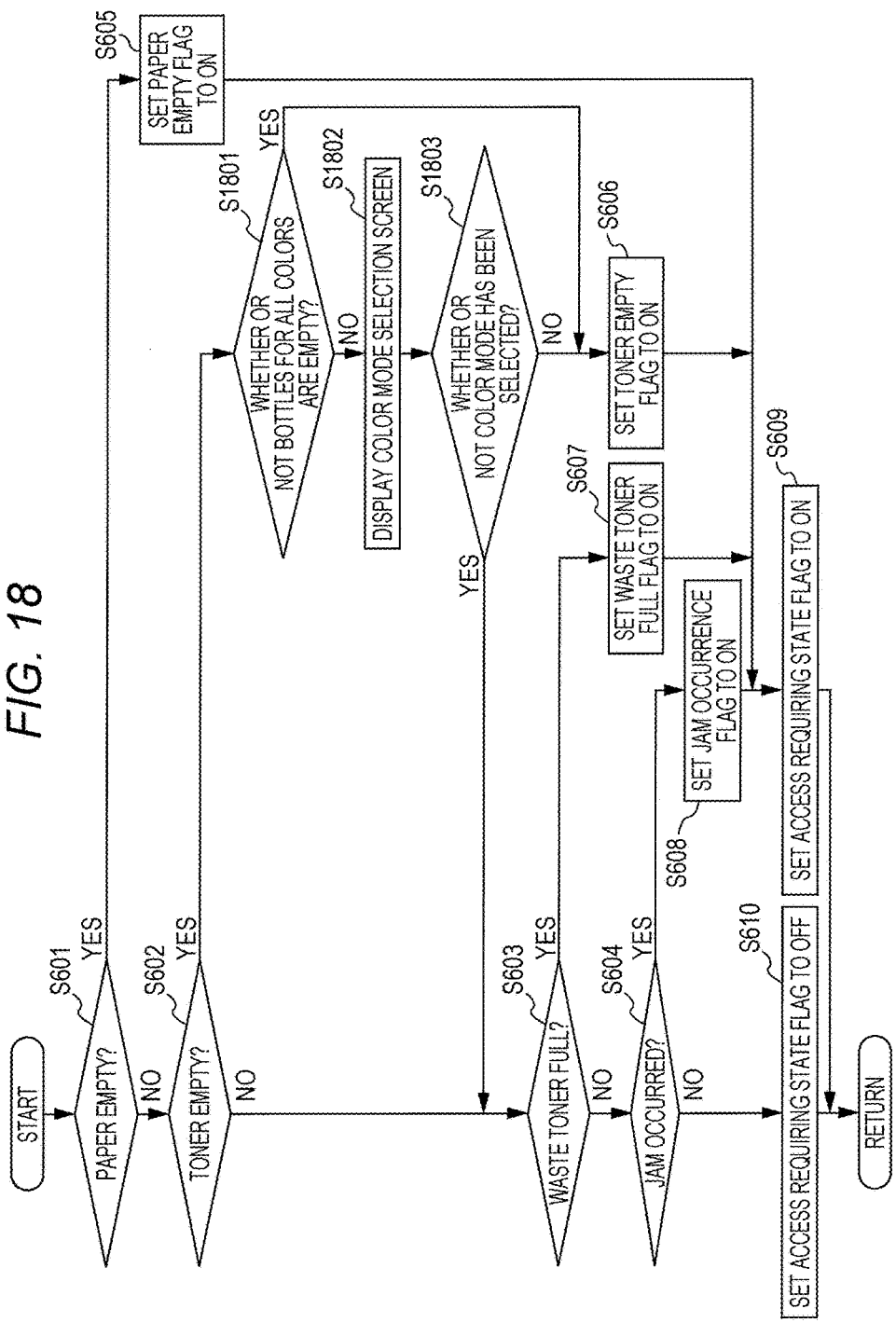
FIG. 18 is a flowchart of a third variation of operation in the processing of determining the state requiring the access to the device body.

Specifically, operation in the above-described processing of determining the access requiring state as shown in FIG. 6 may be changed to operation as in FIG. 18. In FIG. 18, the same step numbers as those of the processing of FIG. 6 are used to represent equivalent processing contents, and description thereof will not be repeated. Differences will be mainly described below.

When the determination result at the step S602 is positive (YES: step S602), the control section 60 determines whether or not the toner bottles for all colors are toner-empty (step S1801). When a determination result at the step S1801 is negative (NO: step S1801), the control section 60 displays, on the operation panel 7, a screen for selecting the two-color mode or the single-color mode to receive user selection (step S1802). When the determination result at the step S1801 is positive (YES: step S1801), the control section 60 transitions to the processing of the step S606. On the above-described selection screen, selection between the two-color mode and the single-color mode and selection of a color to be used in the selected mode can be performed. Colors for which the toner is not empty are displayed as options on the screen for selecting the color to be used, and other colors than black are displayed as options in the case of the two-color mode.

Moreover, on the above-described selection screen, a non-selection button for instructing not to select any modes is also displayed. When any of the two-color mode and the single-color mode has been selected on the above-described selection screen (YES: step S1803), the control section 60 transitions to the processing of the step S603. When any of the two-color mode and the single-color mode has not been selected on the above-described selection screen (the non-selection button has been selected) (NO: step S1803), the control section 60 transitions to the processing of the step S606.

With this configuration, when the toner in some of the colors becomes empty in execution of the printing job, if it is desired to continue the printing job without replacing the toner bottles, a proper mode can be selected on the color mode selection screen displayed on the operation panel 7 at the operation position, and therefore, the printing job can be continued without moving the operation panel to the housing position. As a result, lowering of the operability of the operation panel by the user can be prevented in the toner empty state.

(7) In the embodiment and the variations (2) to (4) as described above, the record sheet information, the toner bottle information, the waste toner bottle information, and the jam information are, as the state information, targeted for monitoring. The operation panel 7 moves from the operation position to the housing position when the paper supply cassette becomes empty, when the toner bottle becomes toner-empty, when waste toner bottle is in the full state, and when jam occurs. However, the monitoring target is not limited to the above-described information, needless to say.

As long as the information (e.g., the cassette information and the front door information in the variation (1)) can be used for determination on whether or not the user access to the front of the device body is required, the monitoring target may include other types of information than the above-described information to execute the processing of determining the state requiring the access to the front of the device body.

Alternatively, all types of information described above are not necessarily targeted for monitoring, but at least one of the above-described information types may be targeted for monitoring to execute the above-described processing of determining the access requiring state.

Moreover, for executing the above-described processing of determining the access requiring state, only the record sheet information may be, as the state information, targeted for monitoring in the variation (5), and only the toner bottle information may be, as the state information, targeted for monitoring in the variation (6).

(8) In the embodiment and the variations (1) to (7) as described above, it is configured such that the operation panel position control processing is applied to the operation panel configured to move between the operation position and the housing position by the rotary mechanism. However, the operation panel position control processing is, needless to say, also applicable to an operation panel configured to move between the operation position and the housing position by other mechanisms than the rotary mechanism.

For example, the following configuration may be employed: a slide mechanism configured to slidably move the operation panel 7 in an in-machine paper discharge space between the image reading device 6 and the printer section 30 is provided not to interfere with discharging of a record sheet to the paper discharge section 40, and the slide mechanism is driven by a drive section to move the operation panel 7 between the operation position at which the operation panel 7 protrudes from the front of the device body and the housing position at which part or the entirety of the operation panel 7 is retracted into the in-machine paper discharge space.

The present invention relates to an image formation device such as a printer and a copying machine, and can be particularly used for an image formation device configured such that an operation panel is disposed at a position protruding from a device body.

According to an embodiment of the present invention, with the above-described configuration, determination is, based on the state information indicating the state of the device body, on the state requiring the user access to the device body or the state of accessing to the device body. When it is determined as being the state requiring the access or the state of accessing to the device body, control is made such that the operation panel is retracted to a second position closer to the device body with respect to a first position at which the operation panel protrudes from the front of the device body. Thus, upon the user access to the device body, the operation panel less interferes with the user, and the user less contacts the operation panel.

For a current state, the hardware processor preferably further determines, based on the obtained state information, whether or not the state requiring the access or the state of accessing to the device body has ended, and when ended, the hardware processor preferably moves the operation panel from the second position to the first position.

With this configuration, when the state requiring the access to the device body or the state of accessing to the device body has ended, control is made such that the operation panel moves to the first position easily operable by the user. Thus, after the end of the above-described state, there is no disadvantage in the operability of the operation panel by the user.

The image formation device preferably further includes a user detection device configured to detect the presence of the user near the operation panel. When the state requiring the access or the state of accessing to the device body has ended, the hardware processor preferably moves the operation panel from the second position to the first position upon detection of the presence of the user by the user detection device after any of the states has ended.

With this configuration, after the state requiring the access to the device body or the state of accessing to the device body has ended, when the user detection device has detected the presence of the user near the operation panel, control is made such that the operation panel moves to the first position from the second position at which the operation panel is retracted. This can prevents the following interference: the operation panel moves to the first position before the user returns to the position near the operation panel, and as a result, the operation panel interferes with the user when the user returns to the above-described nearby position.

When the state requiring the access or the state of accessing to the device body has ended, the hardware processor preferably moves the operation panel from the second position to the first position after a lapse of the predetermined time after any of the states has ended.

With this configuration, control is made such that the operation panel moves to the first position from the second position at which the operation panel is retracted after a lapse of the predetermined time after the state requiring the access to the device body or the state of accessing to the device body has ended. This can prevent the following interference: the operation panel moves to the first position right after the above-described state has ended, and as a result, the operation panel interferes with the user when the user returns to the position of the operation panel.

The image formation device preferably further includes an input device configured to input the instruction of moving the operation panel to the first position. When the state requiring the access or the state of accessing to the device body has ended, the hardware processor preferably moves the operation panel from the second position to the first position upon input of the moving instruction after any of the states has ended.

With this configuration, control is made such that the operation panel moves to the first position from the second position at which the operation panel is retracted upon input of the instruction of moving the operation panel to the first position after the state requiring the access to the device body or the state of accessing to the device body has ended. This can prevent the following interference: the operation panel moves to the first position before the user returns to the position of the operation panel, and as a result, the operation panel interferes with the user when the user returns to the position of the operation panel.

The image formation device preferably further includes a plurality of record sheet housing sections each configured to house a record sheet. The hardware processor preferably stores the paper size of the record sheet housed in each record sheet housing section. The state information preferably includes information on whether or not each record sheet housing section housing the record sheet is empty. When any of the record sheet housing sections is empty, if there are no other non-empty record sheet housing sections each housing the record sheet having the identical paper size to that of the record sheet housed in the empty record sheet housing section, the hardware processor preferably makes determination as being the state requiring the user access; and if there are other non-empty record sheet housing sections, the hardware processor preferably makes determination as not being the state requiring the user access, and preferably stops the operation panel from retracting to the second position.

With this configuration, even when the record sheet housing section housing record sheets becomes empty, if record sheets having the same paper size as that of these record sheets are housed in another record sheet housing section, retraction of the operation panel to the second position is prevented.

As a result, when it is desired to continue the printing job without the user's record sheet resupply operation of supplying record sheets from another record sheet housing section in a record sheet non-empty state, the instruction and operation of easily switching the record sheet housing section can be easily made from the first position. Thus, the printing job can be continued without retracting the operation panel. As a result, lowering of the operability of the operation panel by the user can be prevented in a record sheet empty state.

The image formation device preferably further includes a plurality of toner housing sections configured to respectively house plural types of toner for different colors. The state information preferably includes information on whether or not the toner housed in each toner housing section is empty. A selection input device is preferably provided, which is configured such that when the information shows that any of the toner housing sections is empty, selection of the subtractive color printing mode for executing the printing job by using one or more types of toner other than the toner in the empty toner housing section is input. When the subtractive color printing mode has not been selected, the hardware processor makes determination as being the state requiring the user access. When the subtractive color printing mode has been selected, the hardware processor makes determination as not being the state requiring the user access, and stops the operation panel from retracting to the second position.

With this configuration, when any of the toner housing sections is empty, if selection of the subtractive color printing mode for executing the printing job by using one or more types of toner other than the toner in the empty toner housing section is input, retraction of the operation panel to the second position is prevented.

Thus, when any of the toner housing sections is empty, if the user wishes to continue the printing job without exchanging the toner housing section, the operation of selecting the subtractive color printing mode can be easily performed from the first position without retracting the operation panel, thereby continuing the printing job. As a result, lowering of the operability of the operation panel by the user can be prevented in the toner empty state.

Although the present invention has been described and illustrated in detail, it is clearly understood that the same is by way of illustrated and example only and is not to be taken by way of limitation, the scope of the present invention being interpreted by terms of the appended claims.

What is claimed is:
1. An image formation device for executing a printing job to form a toner image on a record sheet, comprising:
 an operation panel configured to move between a first position at which the operation panel protrudes from a front of a device body and a second position at which the operation panel is retracted to a device body side with respect to the first position;
a hardware processor configured to:
obtain state information indicating a state of internal workings of the device body; and
determine, based on the obtained state information, whether the state of the internal workings of the device body is a state that will require access to the device body, and
to retract the operation panel to the second position before user access to the device body based on a determination result that the state of the internal operation of the device body requires the user access to the body;
wherein the state information includes one or more of:
information on whether or not a consumable of the device body is empty,
information on whether or not a waste toner bottle in the image forming device is in a full state, and
information on whether or not a jam occurs within the device body;
wherein the user access to the device body includes one or more of:
opening a door at the body; and
pulling out a cassette in the door.

2. The image formation device according to claim 1, wherein
the state information is information on whether or not a consumable of the device body is empty, and
when the consumable is empty, the hardware processor makes the determination as being the state requiring access.

3. The image formation device according to claim 1, wherein
the state information is information on whether or not the waste toner bottle is in a full state, and
when the waste toner bottle is in the full state, the hardware processor makes the determination as being the state requiring access.

4. The image formation device according to claim 1, wherein
the state information is information on whether or not the jam occurs in the device body, and
when the jam occurs, the hardware processor makes the determination as being the state requiring access.

5. The image formation device according to claim 1, wherein
for a current state, the hardware processor further determines, based on the obtained state information, whether or not the state requiring access has ended, and
when ended, the hardware processor moves the operation panel from the second position to the first position.

6. The image formation device according to claim 5, wherein the hardware processor is further configured to detect a presence of the user near the operation panel, wherein
when the state requiring access has ended, the hardware processor moves the operation panel from the second position to the first position upon detection of the presence of the user by the hardware processor after any of the states has ended.

7. The image formation device according to claim 5, wherein
when the state requiring access has ended, the hardware processor moves the operation panel from the second position to the first position after a lapse of a predetermined time after any of the states has ended.

8. The image formation device according to claim 5, wherein the hardware processor is further configured to receive an input of an instruction of moving the operation panel to the first position, wherein
when the state requiring access has ended, the hardware processor moves the operation panel from the second position to the first position upon input of the moving instruction after any of the states has ended.

9. The image formation device according to claim 1, further comprising a plurality of record sheet housing sections each configured to house a record sheet, wherein
the hardware processor stores a paper size of the record sheet housed in each record sheet housing section,
the state information includes information on whether or not each record sheet housing section housing the record sheet is empty, and
when any of the record sheet housing sections is empty,
if there are no other non-empty record sheet housing sections each housing the record sheet having an identical paper size to that of the record sheet housed in the empty record sheet housing section, the hardware processor makes determination as being the state requiring access, and
if there are other non-empty record sheet housing sections, the hardware processor makes determination as not being the state requiring access, and stops the operation panel from retracting to the second position.

10. The image formation device according to claim 1, further comprising a plurality of toner housing sections configured to respectively house plural types of toner for different colors, wherein
the state information includes information on whether or not the toner housed in each toner housing section is empty,
a selection input device is provided, which is configured such that when the information on whether or not the toner housed in each toner housing section is empty shows that any of the toner housing sections is empty, selection of a subtractive color printing mode for executing the printing job by using one or more types of toner other than the toner in the empty toner housing section is input,
when the subtractive color printing mode has not been selected, the hardware processor makes determination as being the state requiring access, and
when the subtractive color printing mode has been selected, the hardware processor makes determination as not being the state requiring access, and stops the operation panel from retracting to the second position.

11. The image formation device according to claim 1, wherein
the hardware processor displays, on the operation panel, information on a current state of the device body when the determination result is positive.

12. The image formation device according to claim 1, wherein the second position of the operation panel does not protrude from the front of the device body.

13. The image formation device according to claim 1, wherein the information on whether or not a consumable of the device body is empty is detected by a consumable detection sensor.

14. The image formation device according to claim 1, wherein the information on whether or not the waste toner bottle in the image formation device is in a full state is detected by a consumable detection sensor.

15. The image formation device according to claim 1, wherein the information on whether or not a jam occurs within the device body is detected by a jam detection sensor.

16. The image formation device according to claim 1, wherein the hardware processor is configured to retract the operation panel to the second position before user access to the device body based only on a determination result that the state of the internal operation of the device body requires the user access to the body.

* * * * *